(12) United States Patent
Schiesser

(10) Patent No.: US 10,268,726 B1
(45) Date of Patent: Apr. 23, 2019

(54) PARTITION KEY MANAGEMENT FOR IMPROVED THROUGHPUT

(71) Applicant: Amazon Technologies, Inc., Seattle, WA (US)

(72) Inventor: Steven Eric Schiesser, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 174 days.

(21) Appl. No.: 15/493,047

(22) Filed: Apr. 20, 2017

(51) Int. Cl.
*G06F 17/30* (2006.01)
*H04L 29/08* (2006.01)
*H04L 29/06* (2006.01)

(52) U.S. Cl.
CPC .. *G06F 17/30486* (2013.01); *G06F 17/30312* (2013.01); *H04L 67/101* (2013.01); *H04L 67/1097* (2013.01); *H04L 67/42* (2013.01)

(58) Field of Classification Search
CPC ......... G06F 17/30486; G06F 17/30312; H04L 67/1097; H04L 67/101; H04L 67/42
USPC ....................................................... 707/736
See application file for complete search history.

(56) References Cited

U.S. PATENT DOCUMENTS

| | | | | |
|---|---|---|---|---|
| 6,341,289 B1 * | 1/2002 | Burroughs | ........ | G06F 17/30607 707/737 |
| 7,475,055 B2 * | 1/2009 | Hutchison | ......... | G06F 17/30545 |
| 7,774,379 B2 | 8/2010 | Basu et al. | | |
| 8,868,711 B2 * | 10/2014 | Skjolsvold | ............ | G06F 9/5083 709/223 |
| 9,152,664 B2 | 10/2015 | Abrink | | |
| 9,852,010 B2 * | 12/2017 | Skjolsvold | ............ | G06F 9/5077 |
| 2005/0251511 A1 * | 11/2005 | Shankar | ............ | G06F 17/30454 |
| 2008/0046454 A1 * | 2/2008 | Basu | .................. | G06F 17/30587 |
| 2008/0228783 A1 * | 9/2008 | Moffat | .............. | G06F 17/30241 |
| 2012/0143873 A1 * | 6/2012 | Saadat | .............. | G06F 17/30321 707/741 |
| 2013/0204917 A1 * | 8/2013 | Wang | .................... | G06F 9/5066 709/201 |
| 2017/0316077 A1 * | 11/2017 | Ng | .................... | G06F 17/30598 |

(Continued)

OTHER PUBLICATIONS

Ogawa, Hirotaka, et al., "SSS: An Implementation of Key-value Store based MapReduce Framework", CloudCom 2010, Indianapolis, IN, Nov. 30-Dec. 3, 2010, IEEE, pp. 754-761.*

*Primary Examiner* — Robert Stevens
(74) *Attorney, Agent, or Firm* — Robert C. Kowert; Meyertons, Hood, Kivlin, Kowert & Goetzel, P.C.

(57) ABSTRACT

Systems and methods are provided to implement a client system that distributes accesses to database object in a database across different partitions of the database object. The client specifies a partition key and a sort key for the database object, so that data items in the database object are partitioned based on the partition key and sorted in each partition based on the sort key. The client determines a set of partition key values based on a throughput criteria of the database object and a per-partition throughput limit. To insert a data item into the database object, the client assigns a partition key value from the set to the data item using an assignment function, configured to distribute accesses to the database object across its partitions to balance usage of the partitions. To obtain sorted data from the database object, the client issues queries to obtain results for each partition key value, and then merges the results to produce a fully sorted result set.

20 Claims, 12 Drawing Sheets

(56) References Cited

U.S. PATENT DOCUMENTS

2018/0068008 A1* 3/2018 Cruanes ............ G06F 17/30292
2018/0131757 A1* 5/2018 Helmich ............. H04L 67/1008

* cited by examiner

Figure 5:
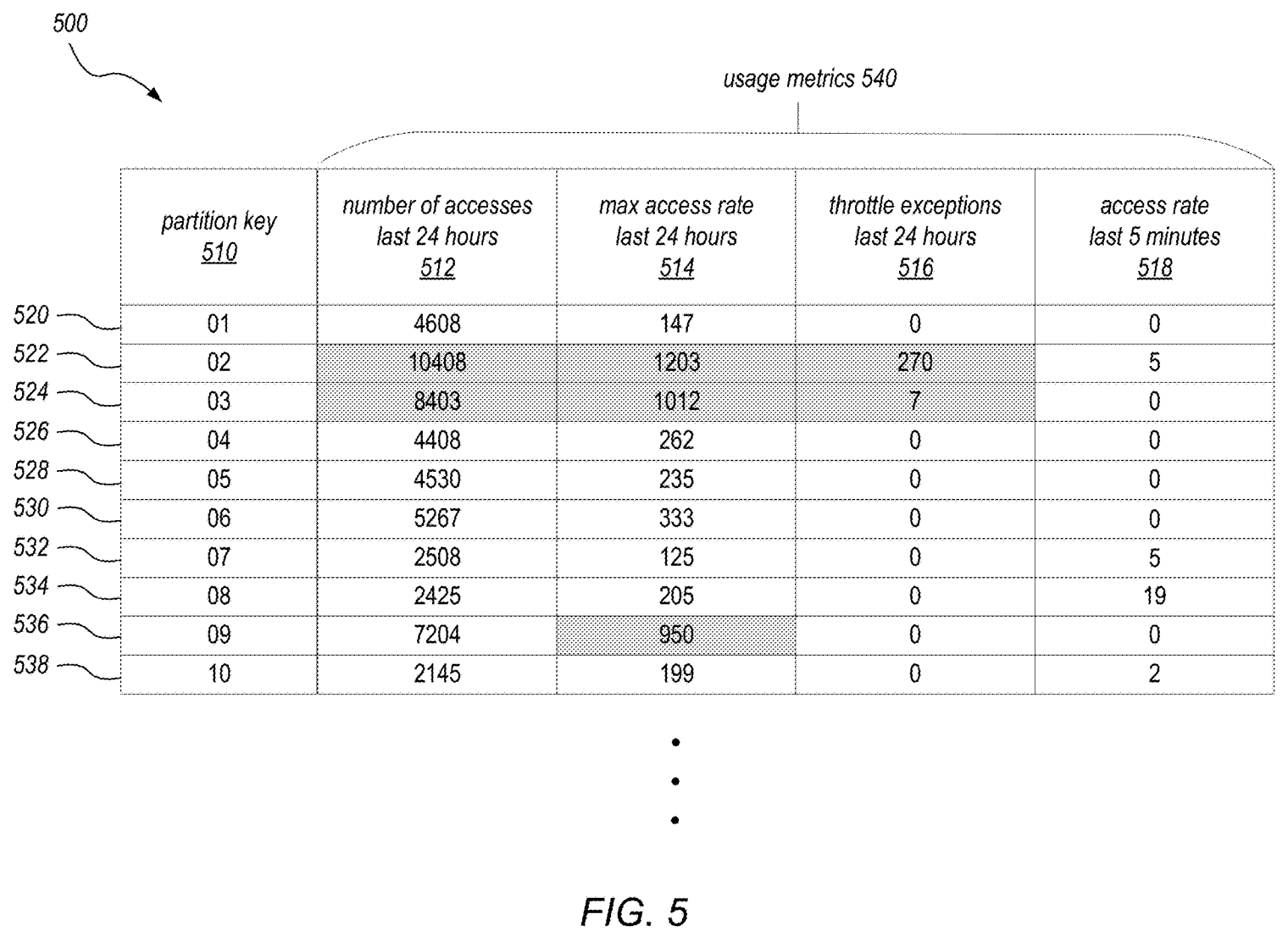

| partition key 510 | number of accesses last 24 hours 512 | max access rate last 24 hours 514 | throttle exceptions last 24 hours 516 | access rate last 5 minutes 518 |
|---|---|---|---|---|
| 01 | 4608 | 147 | 0 | 0 |
| 02 | 10408 | 1203 | 270 | 5 |
| 03 | 8403 | 1012 | 7 | 0 |
| 04 | 4408 | 262 | 0 | 0 |
| 05 | 4530 | 235 | 0 | 0 |
| 06 | 5267 | 333 | 0 | 0 |
| 07 | 2508 | 125 | 0 | 5 |
| 08 | 2425 | 205 | 0 | 19 |
| 09 | 7204 | 950 | 0 | 0 |
| 10 | 2145 | 199 | 0 | 2 |

PARTITION KEY MANAGEMENT FOR IMPROVED THROUGHPUT

BACKGROUND

Database systems managing large amounts of data on behalf of users often receive a high volume of request traffic to access data and to manage the storage of data. In some database service implementations, database objects such as tables or indexes may be partitioned across multiple partitions that are separately managed by different groups of compute nodes. In some systems, each partition may be associated with a throughput limit limiting the number of accesses to the partition (e.g., 1000 write operations per second to each partition). In some cases, users may wish to store a data set in a database object in sorted order. However, in some embodiments of partitioned database objects, data items cannot be easily sorted across different partitions. As a result, users may typically store all data items in one of the partitions to allow the data items to be store in sorted order. However, because the user only uses one partition of the database object, the user is limited by the access throughput limit of the single partition, and does not receive the full provisioned throughput of the database object. Moreover, even if data is stored across the multiple partitions, aggregation work may need to be performed when querying data across the multiple partitions. In addition, keeping the partitions relatively balanced over time also becomes a challenge. In particular, it is generally difficult for users to predict the usage level of each partition when the partitions are populated with real data. These problems generally reduce the efficiency and usefulness of partitioned database objects.

BRIEF DESCRIPTION OF THE DRAWINGS

FIG. 5 illustrates a number of attributes and metrics that may be collected by a client system to manage partition keys for a partitioned database object to improve throughput, according to some embodiments.

Figure 1A:
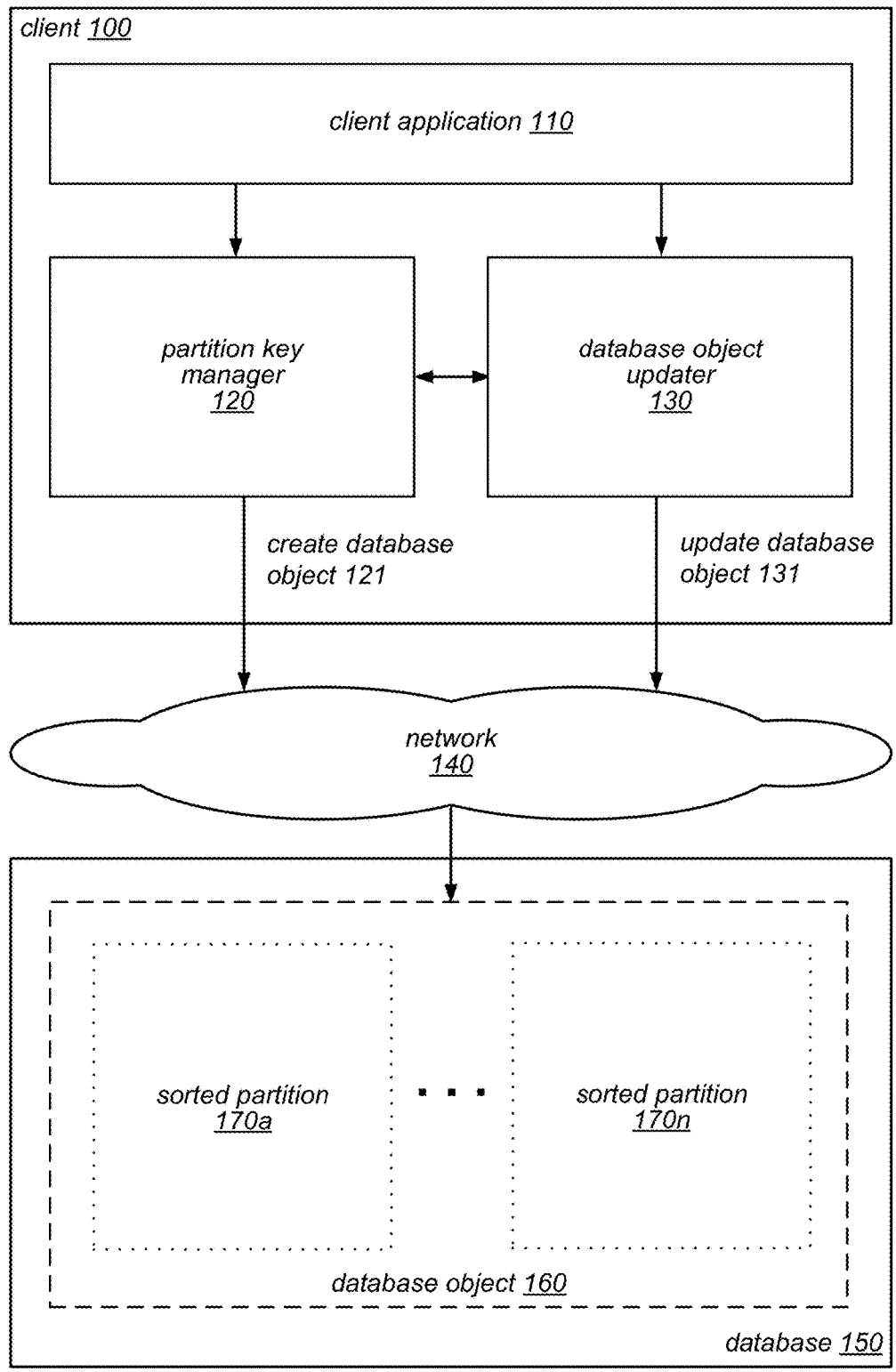
FIG. 1A is a block diagram illustrating an example client system that manages partition keys for a partitioned database object to improve throughput, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a client system of a database that manages partition keys for a database object in the database to improve access throughput to the database object. In some embodiments, the database object may be a table or an index that stores data items in multiple partitions. The client system may be used to automatically generate and manage partition key values for these database objects, which can be used to distribute data items in these database objects so as to improve the overall throughput that can be achieved from these objects.

Non-relational data stores offer accessible and scalable storage to one or more different clients. For example, tables of items, which may include one or more data values or attributes, may be stored, managed and accessed according to a key value pair that uniquely identifies an item in the table. For instance, a table that stores items for pizza orders may include the following attributes: an order identifier, a store identifier, a customer zip code, and an order time. In this table, the order identifier may be the primary key, which is unique for each item.

In some embodiments, a database object may have a partition key that determines which partition an item is stored in. Key-partitioned database objects are thus stored in a plurality of partitions based on the partition key. In some embodiments, each partition may be independently managed by a group of compute nodes, such that accesses to the data in one partition are handled by the nodes that manage that partition. In some embodiments, the partition key may be a different attribute from the primary key. For example, the pizza order table may be partitioned using the store identifier, in which case the items are partitioned according to their store identifier.

In some implementations, a secondary index may be generated for the table such that the data may be organized and accessed based on a different partition key than the table's partition key, which may be the partition key of the table's primary index. For example, a secondary index may be created for the pizza order table above, which is partitioned based on the zip code attribute. Moreover, in some embodiments, the items may be stored in sorted order within each partition. For example, within each zip code partition in the pizza order table, the pizza order items may be stored in sorted order according to the order time attribute. Thus, the zip code attribute in the secondary index may be the partition key for the index, and the order time attribute may be referred to as a sort key for the index. With the index, a query for orders within a particular range of order times within a specific zip code may be quickly performed without performing a full scan of the table or index, which is partitioned according to the store identifier and sorted differently.

While these types of partitioned objects can provide a number of benefits to the user such as increased parallelization and scalability, they also create problems in some contexts. For example, in some cases, data in these objects may not be distributed evenly across the different partitions. This may occur for example in a situation where the user selects an inappropriate attribute as the partition key. In some cases, it is difficult for the user to predict the amount of data and usage level for a partition key value, and thus the partitions of the object may grow out of balance over time. In other cases, the user may wish to store a data set in fully sorted order, which may not be possible across multiple partitions. Thus, the user may assign a single partition key value to all data items so as to store all the item in a single partition. These situations all lead to unbalanced partitions, which reduces the overall efficiency of the partitioning system.

In some embodiments, the database system may implement usage control parameters for each partition. For example, in some embodiments, the database service provider may impose a limit on the capacity or number of data items stored in each partition. In some embodiments, the database service provider may impose a throughput limit (e.g., number of read or write accesses per time period) for each partition. In some cases, these limits may be specified by the customer of the objects and used to determine a billing amount to the customer.

From the customer's perspective, to get more throughput for a partitioned object in such a system, the data needs to be split across multiple partition keys, and have the data automatically managed so as to keep the usage level of each partition key relatively balanced. Accordingly, in some embodiments disclosed herein, a client system is provided to automatically create a set of partition keys for a partition database object (e.g., a table), and assign items to be stored in the object with different partition key values (e.g., a number within a range from 1 to 10). The partition key values may be assigned in a way such that reads and writes are evenly distributed across the partition key values, and so that there are enough partition keys take full advantage of the physical partitions that the object actually has. In this way, the user is able to consume more of the database object's overall provisioned throughput, which is based on the use of all of the database objects physical partitions. In addition, the client system may be configured to automatically manage the data to keep usage of each of the partition key relatively balanced over time. Such rebalancing in the data allows the system to adaptively remove developing access hot spots in the data and maximize the usage of the multiple partitions. In many cases, the rebalancing is better implemented from the client system, which has a better understanding of the data than the database system, and can thus assign the partition key values in a more intelligent manner.

In cases where the user wishes to maintain the data in fully sorted order, the client system may implement a query manager to perform the sorting. In some embodiments, data may be stored in multiple partitions, in sorted order within each partition. In response to a query for sorted data, the query manager may submit subqueries to each partition key value, and then perform a merge sort to produce a completely sorted result set. Because the results to the subqueries are already sorted locally, the global sort may be performed quickly, in a single pass. These and other features and benefits of the inventive system and method are described in further detail below, in connections with the figures.

FIG. 1A is a block diagram illustrating an example client system that manages partition keys for a partitioned database object to improve throughput, according to some embodiments. The client system 100 may encompass any type of client configurable to submit services requests to a network-based database system 150 via network 140. In some embodiments, the database system 150 may not be a network-based storage service, but rather be accessed by a client 100 in the same computer. In some embodiments, a given client 100 may include a suitable version of a web browser or a plug-in module for a web browser, or other type of code module configured to execute as an extension to or within an execution environment to provide database or data storage service clients (e.g., client applications, users, and/or subscribers) access to the services provided by database system 150. Alternatively, a client 100 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 100 may be an application configured to interact directly with the database system 150. In some embodiments, a client 100 may be configured to generate web service requests according to a Representational State Transfer (REST)-style web services architecture, a document- or message-based web services architecture, or another suitable web services architecture.

In some embodiments, client 100 may be configured to provide access to database system 150 to client application 110 in a manner that is transparent to those applications. For example, a client 100 may be configured to integrate with an operating system or file system to provide storage in accordance with a suitable variant of the storage model described herein. In some embodiments, the operating system or file system may present a different storage interface to applications 110, such as a game, a conventional file system hierarchy of files, directories and/or folders, etc. In some embodiments, applications 110 may not need to be modified to make use of the database system model described herein. Instead, the details of interfacing to database system 150 may be coordinated by the client 100 in a data access layer 130 on behalf of applications 110.

As illustrated, the client system 100 may convey requests to and receive responses from the database system 150 via a network 140. In various embodiments, network 140 may encompass any suitable combination of networking hardware and protocols necessary to establish network communications between client 100 and database 150. For example, network 140 may encompass the various telecommunications networks and service providers that collectively implement the Internet. Network 140 may also include private networks such as local area networks (LANs) or wide area networks (WANs) as well as public or private wireless networks. For example, both a given client 100 and database 150 may be respectively provisioned within enterprises having their own internal networks. In such an embodiment, network 140 may include the hardware (e.g., modems, routers, switches, load balancers, proxy servers, etc.) and software (e.g., protocol stacks, accounting software, firewall/security software, etc.) necessary to establish a networking link between given client 100 and the Internet as well as between the Internet and database 150. In some embodiments, client 100 may communicate with network-based database 150 using a private network rather than the public Internet. For example, a client 100 may be provisioned within the same enterprise as the database 150 and/or the underlying system described herein. In some embodiments, a client 100 may comprise a service that is offered by the same service provider that offers the database 150 as a service. The client 100 may communicate with the database 150 entirely through a private network 140 (e.g., a LAN or WAN that may use Internet-based communication protocols but which is not publicly accessible).

In some embodiments, the database 150 may be configured to implement one or more service endpoints configured to receive and process service requests, such as requests to access database objects maintained on behalf of clients/users by database 150, and/or the items and attributes stored in those database objects. For example, database 150 may include hardware and/or software configured to implement various service endpoints and to properly receive and process HTTP-based web services requests directed to those endpoints. In one embodiment, database 150 may be implemented as a server system configured to receive web services requests from clients 110 and to forward them to various components that collectively implement a data storage system for processing. In some embodiments, database 150 may be configured as a number of distinct systems (e.g., in a cluster topology) implementing load balancing and other request management features configured to dynamically manage large-scale web services request processing loads.

The database 150 may include different versions of some of the components illustrated in the figure to provide functionality for creating, accessing, and/or managing tables and/or indexes maintained in database instances within a single-tenant environment than those that provide functionality for creating, accessing, and/or managing tables and/or indexes maintained in database instances within a multi-tenant environment. In various embodiments, the components in the database 150 may be implemented directly within computer hardware, as instructions directly or indirectly executable by computer hardware (e.g., a microprocessor or computer system), or using a combination of these techniques. For example, the components of the database 150 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

In various embodiments, database 150 may be configured to support different types of service requests. For example, in some embodiments, database 150 may be configured to implement a particular web services application programming interface (API) that supports a variety of operations on tables or indexes, or other data objects, that are maintained and managed on behalf of clients/users by the data storage service system. The APIs provided by the database 150 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

In some embodiments, the control plane APIs supported by the database 150 may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table of index configurations or parameters, e.g., an UpdateTable API (which may be used to increase the provisioned throughput capacity for a given table), a PurchaseTableCapacity API (which may be used to increase the provisioned storage capacity for a given table or index), a SplitTable API (which may be used to explicitly invoke an operation to split a table or index or any of its partitions), or a MoveTable API (which may be used to explicitly invoke an operation to move one or more tables or indexes, partitions of a table, or partition replicas of a table).

In some embodiments, the database 150 may provide an application programming interface (API) that includes support for some or all of the following operations on data maintained in a database object by the service on behalf of a storage service client: put (or store) an item, get (or retrieve) one or more items having a specified primary key or partition key, delete an item, update the attributes in a single item, query for items using an index, and scan (e.g., list items) over the whole table, optionally filtering the items returned. For example, the database 150 may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

In some embodiments, the database 150 may provide an application programming interface (API) that includes support for some or all of the following operations on the data in a table or index maintained by the service on behalf of a storage service client: put (or store) an item, get (or retrieve) one or more items having a specified primary key, delete an item, update the attributes in a single item, query for items using an index, scan (e.g., list items) over the whole table, and/or optionally filtering the items returned. In some embodiments, the API may also include support to create one or more secondary indexes global to a table which may be used to perform different queries efficiently over particular attributes in the table that are used to create the secondary index. In some embodiments, the secondary indexes may store the same logical items as the associated table, but stored differently. For example, items in the secondary indexes may be stored in a different sort order from the table (using a different sort key), or in a different set of partitions as the table (using a different partition key). As another example, items in the secondary indexes may include only a subset of attributes stored in the associated table. In some embodiments, inserts or deletes from the table may automatically trigger inserts or deletes in the indexes associated with the table.

In some embodiments, service requests made via the API may include an indication of one or more user preferences, such as a preferred service request throughput level, or a service request throughput level for which a guarantee is requested. In other embodiments, some or all of these user preferences may be specified when a database object is created, or may be client-specific, account-specific, specific to various database object types, or specified by system-wide default values, rather than being specified on a per-request basis.

In some embodiments, objects in the database 150, such as database object 160, may be divided into partitions 170. Each partition 170 may be independently managed by a group of storage nodes, which may maintain replicas of the data in the partition 170. A partition replica may be assigned to a particular storage node based largely (or solely) on whether there is enough storage capacity for the anticipated size of the database object. For example, the anticipated size may be based on information included in a request to create the table or index, on usage history for the client on whose behalf the table or index was created, or on a history of accesses that target the table or index, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of input/output operations per second ("IOPS"), the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node). In some embodiments, the management of the partitions may be performed by the database 150 in a way that it is largely hidden from the client 100.

In some embodiments, the database 150 may support seamless scaling of user database objects or indexes in a "fully shared nothing" type architecture. For example, in some embodiments, each table or index partition (e.g., partitions 170) may be implemented as a completely independent parallel computation unit. In such embodiments, the system may provide minimal distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, the database 150 and/or underlying system may support a variety of service offerings and/or throughput models. In some embodiments, the database 150 may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, for the database 150 (e.g., for particular tables or indexes maintained on behalf of clients), a client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table or index through a parameter of a request to create the table or index, in some embodiments. In some embodiments, a client/user may specify a default throughput model for all tables or indexes created and maintained on their behalf by the database 150. By supporting both a committed throughput model and a best effort throughput model (for which no throughput guarantees are made), the database 150 may allow clients/users to make a trade-off between performance and cost, according to their needs and/or budgets. Other types of services may support a committed work throughput model and/or other throughput models.

The database 150 and/or underlying system that provides a committed throughput offering may be configured to pre-allocate capacity and/or resources for the creation, growth, and management of a table or index maintained on behalf of a client 100 in response to traffic directed to the table or index, and not to overbook the resources and/or capacity of the storage node(s) on which that table or index is maintained. In some embodiments, tables or indexes maintained by the database 150 and underlying system under a committed throughput model may be maintained in faster (and often more expensive) storage resources, such as high performance media (e.g., flash memory or Solid State Drive, or SSD, media), in order to provide extremely low latencies when servicing requests from the client 100. For example, the database 150 may provide or dedicate a high ratio of fast/local memory to main (e.g., disk) memory for the maintenance of those tables and various partitions thereof. In some embodiments, while the storage resources allocated to a given table or index under a committed throughput model may in some cases be underutilized (at least some of the time), the client 100 may value the predictable performance afforded by the committed throughput model more than the additional (and in some cases wasted) costs of dedicating more resources than may always be necessary for the table or index. Similarly, resources that are pre-allocated to other types of services to support a committed work throughput model may in some cases be underutilized (at least some of the time), but may provide the client 100 with a predictable level of performance (e.g., in terms of availability and/or responsiveness).

As illustrated, the database 150 may implement a multi-partition database object 160 that includes one or more sorted partitions 170*a* to 170*n*. Each sorted partition 170 may be implemented using a group of storage nodes, and be configured to store data items in a sorted order according to a sort key of the database object. In some embodiments, the storage nodes may be implemented using a pool of compute instances, which may be virtual machine instances. The modules of the storage nodes may be configured to perform a storage functions such as the handling of storage requests, partition management, and/or replication and failover processes. In some embodiments, a storage node instance may include a storage engine, which may be configured to maintain (i.e. to store and manage) one or more tables or indexes in storage via storage API.

Returning to the client 100, as shown, some embodiments of the client 100 may include a partition key manager 120 and a database object updater 130. In some embodiments, the partition key manager 120 may be responsible for sending the initial request to create the database object 160 in the database 150. The database object 160 may be a partitioned object, such as a partitioned table or an index. In some embodiments, the partition key manager may specify a partition key for the database object 160. The partition key may be a generated attribute for the database object 160, that is populated by a set of partition key values generated and maintained by the client 100. In some embodiments, by manipulating the set of partition key values for the data items in the data object, the client 100 may control the utilization level of the sorted partitions 170.

In addition to sending the request to create the database object, the partition key manager may generate a set of partition key values to be used for the data items to be stored in the database object. In some embodiments, the partition key manager 120 may be responsible for determining the set of partition key values that are used to store data items in a multi-partition object in the database 150, such as the database object 160. For example, the set of partition keys may include a set of numbers from 0 to 9, which may be later assigned to data items to determine which partition of the database object 160 they will be stored in.

In some embodiments, the partition key manager 120 may generate the set of partition key values based on a throughput criteria of the database object 160. In some embodiments, the partition key manager 120 may also be aware of other attributes of the partitions, such as the throughput limit of each partition of a database object 160. For example, such information may be determined from published documentation of the database, or via an API of the database. Based on this information, the partition key manager 120 may generate sufficient keys such that the storage capacity or throughput capacity of all of sorted partitions 170 of the database object 160 can be fully utilized. On the other hand, the partition key manager 120 may generate only no more partition key values than necessary, to avoid excessive work when reading or writing data using the partition key values. In some embodiments, the partition key manager 120 generate a minimum number of partition key values to meet a throughput criteria of the database object.

For example, the partition key manager 120 may create a database object 160 with a throughput criteria of 10000 IOPS. The partition key manager 120 may determine from published documentation and/or a database API that the throughput limit of each partitions is 1000, and so a minimum of 10 partitions will be needed to exercise the full provisioned throughput of the database object. Accordingly, the partition key manager 120 may generate 10 partition key values, so that data items may be spread across all 10 partitions of the database object, to take full advantage of the throughput capacity of the database object.

Depending on the policy or configuration of the partition key manager 120, the partition key manager 120 may generate more than 10 partition key values, so as to provide more flexibility in the balancing of the partition keys across the partitions. For example, in some embodiments, the partition key manager 120 may generate 20 partition key values for 10 partitions. Accordingly, in some embodiments, the partition key manager 120 may be configured to balance multiple considerations to generate an optimal number of partition key values, depending on the situation. In some embodiments, the partition key manager 120 may determine the number of partition key values to used based on whether the database object is a read-heavy database object or a write-heavy database object. For example, if a database object is requested to have a high write throughput but relative low read throughput, the partition key manager 120 may employ a larger number of partition key values. On the other hand, if the database object is request to have a low ratio of write throughput to read throughput, the partition key manager 120 may employ a smaller number of partition key values.

As shown, the client 100 may also include a database object update 130 that is responsible for sending requests to updater 131 the database object after it is created. The updater may for example be configured to insert data items to the database object 160. In some embodiments, the database object update 130 may implement an assignment function to assign each new data item to be inserted with a different partition key value. In some embodiments, the assignment may occur using a pseudorandom value, so that a degree of randomness is included in the assignment. In some embodiments, the assignment function may be performed in a round-robin fashion, so that each partition key value will have approximately the same number of data items. In some embodiments, the assignment function may be based on one or more user attributes in the data item. For example, in some cases, the partition key value may be determined from a hash of one or more attributes of the data item, modulo the size of the partition key value set. This may be useful in situations where the client wishes to distribute data items based on values in the attribute. For example, in some embodiments, the client may distribute data items based on a "country" field, so that all data items from the same countries are evenly distributed. In this way, accesses from each country, which tend to all occur at the same approximate time, will be disturbed evenly across the partition key values.

In some embodiments, the database object update 130 may adjust its assignment function based on the current state of the partitions, or the metrics or statistics gathered for each partition key value. For example, at some point, the database object update 130 may determine that out of the 10 current partition key values used for the database object 160, key values 5 and 7 are overutilized in terms of observed access rate. The observed access rate may indicate, for example, the maximum access rate that is seen for a partition key value over the last 24 or 48-hour period. In some embodiments, the metrics may indicate a number of observed throttle exceptions that are received from the database for a partition key value. For example, when accesses exceed a throughput limit for a partition, the database 150 may begin to ignore further accesses to the database object 160 and instead generate a throttle exception. These exceptions may be collected by the partition key set manager 124 from the other modules in the data access layer 130, and used by the database object update 130 to, for example, avoid inserting aggressively into that partition.

Based on some of the information about the partition key values and using the assignment function, the database object update 130 may populate the partition key attribute of each data item with a selected partition key value. When this is done over a large number of data items, the database object update 130 will spread the data items across each of the partition key values in the partition key set, so that expected accesses to each partition key value will be relatively balanced. In this way, the utilization of each of the partitions 170 will be relatively balanced, allowing the client to take full advantage of the provisioned access throughput of the database object 160.

Figure 1B:
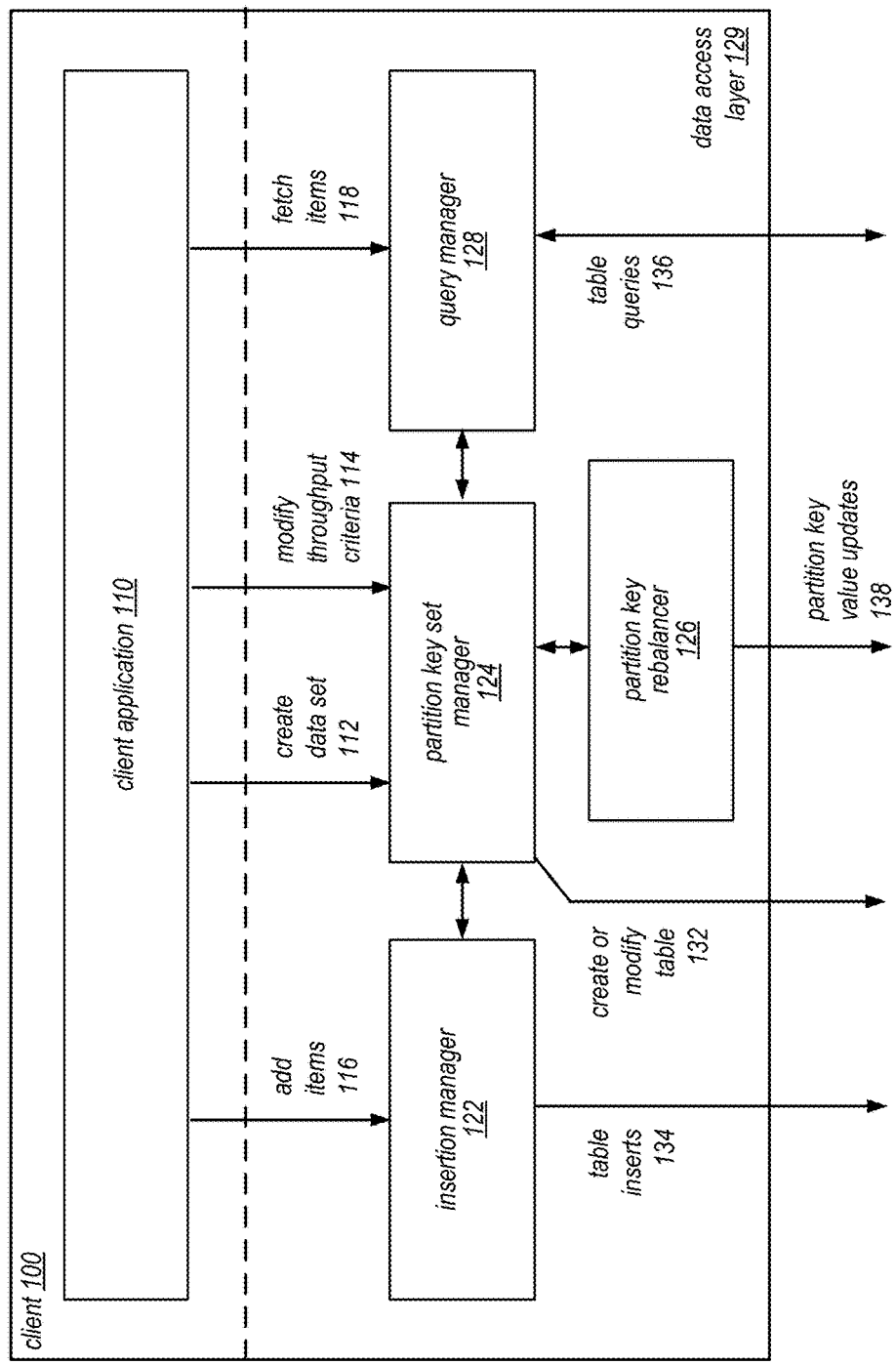
FIG. 1B is a block diagram illustrating another example client system that manages partition keys for a partitioned database object to improve throughput, according to some embodiments.

FIG. 1B is a block diagram illustrating another example client system that manages partition keys for a partitioned database object to improve throughput, according to some embodiments. As illustrated, the client system 100 may implement a data access layer 129. The data access layer 129 may be implemented to hide certain details of interfacing with the database from the client application 110. The data access layer 129 may include a number of modules, such as a partition key set manager 124, an insertion manager 122, a query manager 128, and a partition key rebalancer 126. These modules may collectively form a data access layer that presents an API to client applications 110, so that the applications 110 does not interface directly with the networked database system 150. For example, an API of the data access layer may allow clients 110 to create a data set 112, modify the throughput criteria of the data set 114, add items to the data set 116, and fetch items from the data set 118. The data access layer 129 may be implemented as a standalone code module that is loaded by the client application 110, or one or more separately executing processes or services on the client system 100.

In some embodiments, the partition key set manager 124 may perform the role of the partition key manager 120 discussed in FIG. 1A. For example, the partition key set manager 124 may generate the partition key set in response to a request to create a data set 112 from the client application 110. The partition key set manager may determine the partition key set, and also generate a request 132 to the database 150 to create the database object 160. In some embodiments, the request to create the data set 112 may include a throughput criteria, for example a number of read or write access per second that should be service by the data set. In some embodiments, this throughput criteria is included in the request to create the database object 160, and impacts the number of partitions that are provisioned for the database object 160. In some embodiments, the client application 110 may not specify the throughput criteria, but the criteria may be determined based on configurations or programming logic of the partition key manager 120 itself.

In some embodiments, the partition arrangement of the database object 160 may change subsequent to the database object's creation. This may occur, for example, via an explicit request to modify the throughput criteria 114 for the data set, either by the application 110 or by the database partition key set manager 124. In other examples, a partition arrangement change (either increasing or reducing the number of partitions) may be triggered based on particular metrics of the database object. For example, in some embodiments of the database 150, when a partition or the database object as a whole reaches a partition capacity level or throughput level, some or all of the partitions of the database object may split to create new partitions. In some embodiments, the database 150 may simply provide a way to obtain information about the current set of partitions for a database object 160. For example, the database 150 may provide a callback API to registered observers, so that the observers are notified whenever the partitions of the database object 160 changes. Based on documented information about the partitioning behavior of the database and/or metadata information provided by the database, the partition key manager 120 may be able to predict or detect partition changes in the database 150, and adjust its set of partition key values accordingly. If a new partition is added by the database 150, the partition key set manager 124 may generate one or more new partition key values to place data item on the new partition.

In some embodiments, the partition key set manager 124 may gather metrics or statistical information about each of the partition key values and act as a central repository for such information. For example, in some embodiments, the client system 100 may be the only client for the database object 160. The partition key set manager 124 may have access to all of the access metrics or statistics for the database object. partition key set manager 124 may obtain such information from other modules in the data access layer 130, such as the insertion manager 122 and query manager 128. These other modules, in turn, may feed the partition key set manager 124 with metrics gathered during their interactions with the database 150. For example, the metrics gathered may include information such as the number of read or write requests that are sent to the database object 160, and the access rate. The metrics may also include the number of data items that are stored under each partition key. The metrics may also include the number of throttling exceptions that have been received for data items under each partition key. Such information may be used by the other modules to adjust their behavior to adapt to the state of the database object 160, to keep the partitions 170 relatively balanced, or trigger a reassignment of partition key values among the data items.

As illustrated, the client 100 may implement an insertion manager 122, which may implement some portions of functions of the database object update 130, discussed in connection with FIG. 1A. The insertion manager 122 may receive requests from the application 110 to add items 116 to the data set, and in turn, generate inserts 134 to be performed on the database object 160. In some embodiments, the insertion manager 122 may implement an assignment function to assign each new data item to be inserted with a different partition key value. In some embodiments, the assignment may occur using a pseudorandom value, so that a degree of randomness is included in the assignment. In some embodiments, the assignment function may be performed in a round-robin fashion, so that each partition key value will have approximately the same number of data items. In some embodiments, the assignment function may be based on one or more user attributes in the data item. For example, in some cases, the partition key value may be determined from a hash of one or more attributes of the data item, modulo the size of the partition key value set.

In some embodiments, the insertion manager 122 may adjust its assignment function based on the current state of the partitions, or the metrics or statistics gathered for each partition key value. For example, at some point, the insertion manager 122 may determine that out of the 10 current partition key values used for the database object 160, key values 5 and 7 are oversaturated in terms of observed access rate. The observed access rate may indicate, for example, the maximum access rate that is seen for a partition key value over the last 24 or 48-hour period. In some embodiments, the access rate may be determined based on a number of observed throttle exceptions that are received from the database for a partition key value. For example, when accesses exceed a throughput limit for a partition, the database 150 may begin to ignore further accesses to the database object 160 and instead generate a throttle exception. These exceptions may be collected by the partition key set manager 124 from the other modules in the data access layer 130, and used by the insertion manager 122 to, for example, avoid inserting aggressively into that partition.

As illustrated, the client system 100 may include a query manager 128, which may receive requests from the application to fetch items 118 from the data set, and in turn, generate queries 136 to be performed on the database object 160. In some embodiments, because the partition keys in the database object are automatically generated by the partition key set manager, they are not known or used by the client application 110 to fetch data items. Thus, in some embodiments, the query manager 128 may take the received fetch request, and generate a number of queries to the database object 160, one query for each partition key value maintained by the partition key set manager 124. When the results are returned from each query, the query manager 128 may aggregate the results and provide them back to the client application 110.

In some cases, the aggregation may simply involve sending all query results directly back to the client application 110. In some cases, the query manager 128 may perform some degree of processing before returning the results. For example, if the fetch request 118 requires that the results be sorted, the query manager 128 may perform a sort of the results from the multiple queries. In the case that the sort order is based on a sort key of the database object, the returned query results may already be locally sorted for each partition key. In that case, the query manager may perform a merge sort to produce a globally sorted result set. The merge sort may be performed quickly, in a single pass of all query results, since the individual query results are already sorted. In some embodiments, additional processing of sub-query results may be performed by the query manager 128. For example, the query manager 128 may perform aggregation functions such as finding the maximum, minimum, top 5, sum, average, etc. of the data set. Some of these functions may be performed based on the processing already performed by the database 150 in handling the queries.

As illustrated, the client system 100 may include a partition key rebalancer 126, which may generate partition key updates 138, to move some data items from one partition key value to another partition key value. In some embodiments, the movement may be performed with a simple update command to the database 150 to change the partition key attribute of a subset of data items in the database object, and the database 150 will take care of moving the items from one partition to another. In some embodiments, the movement may require the client system 100 to explicitly remove the data items from the old partition and insert the data items into the new partition.

The partition key update may be performed for a number of reasons. In some embodiments, the partition key rebalancer 126 may observed from the metrics collected by the partition key set manager 124 that the partition keys are out of balance. For example, one partition key value may be experiencing a high rate of access, while a second partition key value may be experiencing very low rate of access. Based on this information, the partition key rebalancer 126 automatically move data items from the first partition key value to the second partition key value, so as to balance usage of the keys. In some embodiments, when a throttling exception is received for a partition key value, the partition key rebalancer 126 may begin to move data items away from that partition key value. In some embodiments, the partition key rebalancer 126 may monitor usage metrics to detect throttling exceptions received for each partition key value. If the throttling exceptions indicate an out-of-balance condition, for example, if some partition key values experience throttle exceptions while others do not, the rebalancer 126 may take steps to reassign data items away from the key values generating the throttling exceptions.

In some embodiments, after a new partition key value is added to the partition key set by the partition key set manager 124, the partition key rebalancer 126 may begin to move some data items from some of the existing partition keys to the newly added partition key. In some embodiments, prior to the removal of a partition key value by the partition key set manager, the partition key rebalancer 126 may move all data items associated with the partition key to be removed to other partition key values.

In some embodiments, the movement of the data items among the partition key values may be performed in a background process to slowly rebalance the partition key values. The movements may occur constantly or periodically. In some embodiments, the movements may occur during times when neither the source or destination partition keys are experiencing high activity. For example, in some embodiments, one of the metrics collected by the partition key set manager 124 is the number of recent accesses or the recent access rate of the partition key values. The partition key rebalancer 126 may use these values to limit movements to times when the two partition keys are relatively idle. In some embodiments, the rebalancer 126 may postpone updates to or reassignments of the partition key values for a specified period of time (e.g., 5 minutes), when the usage metrics (e.g., recent access rate) of the partition key values are measured. If the usage data for the source and destination partition key values are below a specified threshold, the rebalancer 126 may perform the update or reassignment. If the usage data are not below the specified threshold, the rebalancer may wait for the period of time (5 minutes), and make another measurement of the usage metrics.

In some embodiments, to avoid generating additional access requests for these rebalancing movements, the partition key rebalancer 126 may piggyback the update of the partition key attribute on other writes to the database. Thus, a single write will perform double duty to carry out the update to the data item as intended by the client application 110, and also the movement of the data item from one partition key to another. Such piggybacking avoids generating large amounts of traffic that results from overzealous rebalancing, and matches the rebalancing efforts to actual usage of the data (i.e., more useful data are more meticulously balanced). In some cases, when partition key updates are piggybacked on other writes, the partition key rebalancer 126 may implement a round robin reassignment, to distribute the data items that are accessed close in time among different partition key values. Such dispersal reduces the temporal spikes that are seen in the accesses, and further promotes the efficient use of the partitions.

Figure 2:
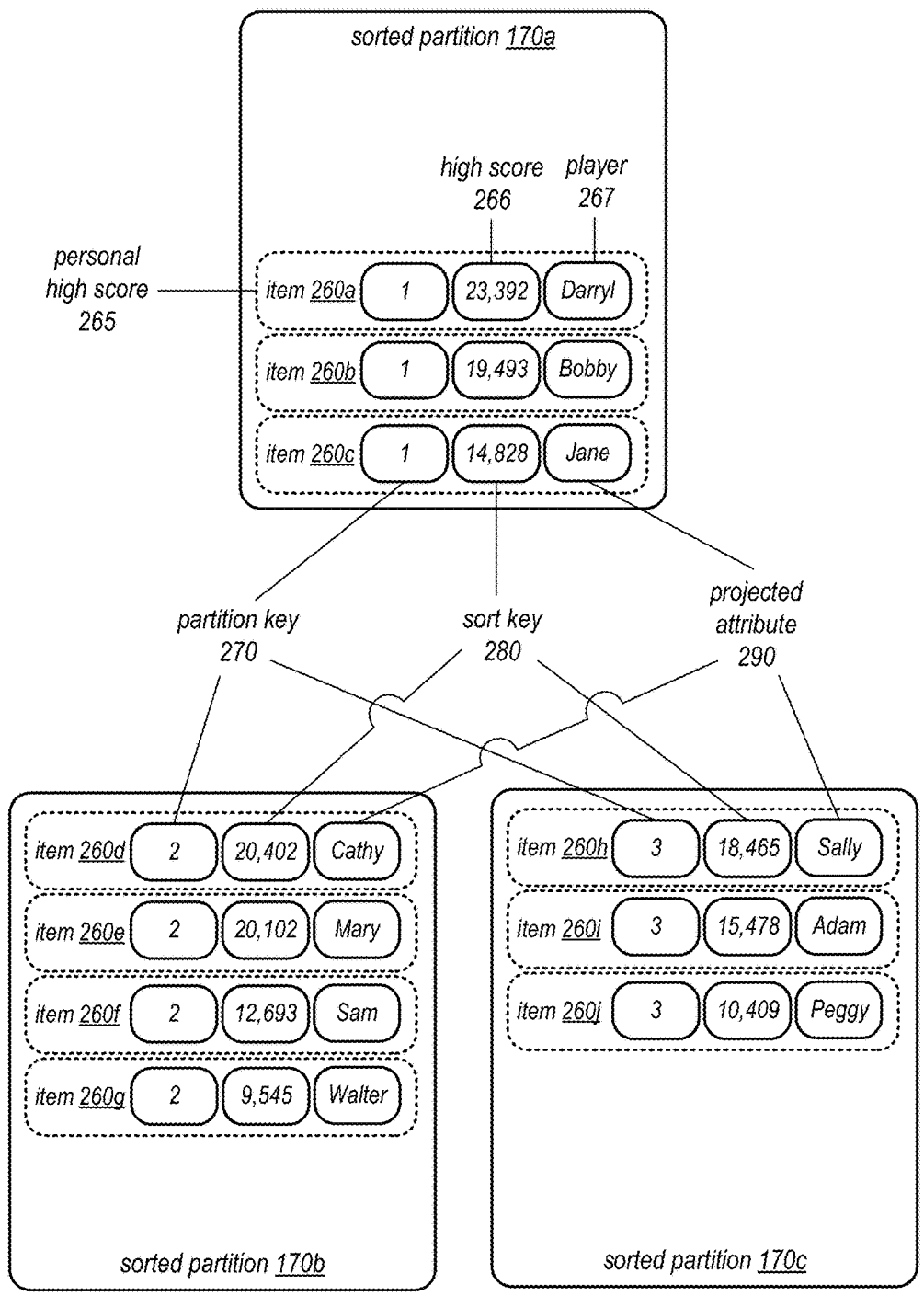
FIG. 2 is a logical block diagram illustrating example keys that are used in a computer system that implements the partitioning of data in an index to improve throughput, according to some embodiments.

FIG. 2 is a logical block diagram illustrating example keys that are used in a computer system that implements the partitioning of data in an index to improve throughput, according to some embodiments. FIG. 2 illustrates three sorted partitions 170*a-c* for an index that stores data items 260 for a game score leader board, where each data item represents a personal high score 265 of a player in a game. Each personal high score entry has a value for the high score 266 and a player name 267. The client applicant may frequently access the leader board in sorted order. Three exemplary sorted partitions 170*a*, 170*b*, and 170*c* may be allocated to a multi-partition index, which may be associated with a table of game scores. The index stores the data items of the table in a different partition arrangement, and possibly in a different sort order within the partitions, so that certain queries may be performed more efficiently from the index rather than the table. In some embodiments, each write to a table will trigger an update to the index, such that data changes in the table are also reflected in the index. As illustrated, the index may be specified to have a partition key 270, a sort key 280, and one or more projected attributes 290, which may be copied from or refer to attributes in the associated table. In some embodiments, the items may have a variable number of attributes.

As illustrated, attribute 270 may be a partition key attribute that dictates which partition each item is stored in. The values for this partition key 270 may be generated by the client system 100, as discussed in connection with FIG. 1. Thus, all items 260*a-c* that have partition key value 1 are stored in sorted partition 170*a*, all items 260*d-g* that have partition key value 2 are stored in sorted partition 170*b*, and all items 260*h-j* that have partition key value 3 are stored in sorted partition 170*c*. As discussed, the client system 100 may assign partition key values (1, 2, 3) to each of the data items, so that access rate stays relatively balanced among the partition key values and the partitions of the index.

As illustrated, the index may also specify a sort key attribute 280. In some embodiments, not all items in the index may have a value for the sort key. Those items that are missing a sort key value will be sorted using the NULL value for the sort key. As discussed, in some embodiments, the items may be stored in the individual partitions in sort order according to the sort key. For example, the sort key 280 may be a time value that corresponds to a score value attribute 266 in a data item. As shown, within sorted partition 170*a*, items 260*a-c* are stored in sort order based on the sort key 280. The same sorting is seen in sorted partitions 170*b* and 170*c*, as illustrated. The sorting facilitates queries that specify the sort key as a query condition. For example, in a range query that queries for the top 10 scores of the game, the sorting allows the query engine to fetch and return the results quickly, without scanning every data item in each of the partitions.

As illustrated, the index may also specify one or more projected attributes 290, which in some embodiments are copied from the table associated with index. In some embodiments, as the table is updated, corresponding values in the index are also changed, including for example the sort key 280 and any projected attributes 290. As illustrated, the projected attributes are non-key attributes in the index, and may be any type of data, such as for example player name 267 associated with the high score.

Figure 3:
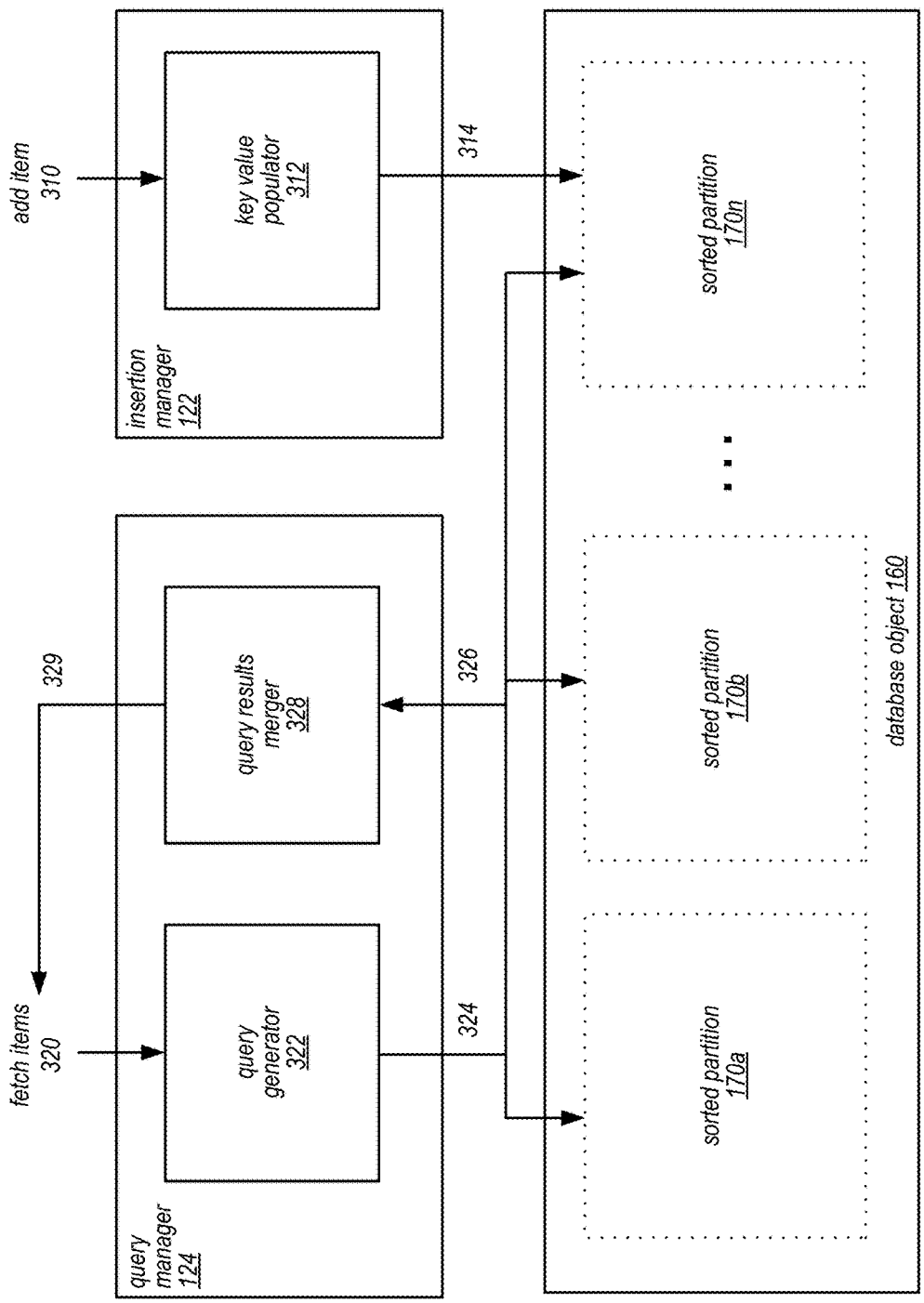
FIG. 3 is a block diagram illustrating components of a client system that manages partition keys for a partitioned database object during insert and query operations, according to some embodiments.

FIG. 3 is a block diagram illustrating components of a client system that manages partition keys for a partitioned database object during insert and query operations, according to some embodiments. As illustrated, the query manager 128 and insertion manager 122, as discussed in connection with FIG. 1, may implement a number of modules to interface with the database 150. The modules illustrated herein are merely exemplary. In some embodiments, some of the modules shown may be implemented together in a single module, in a plurality of separate modules, or in a different location in the client system 100.

In some embodiments, the insertion manager 122 may implement a key value populator 312. The key value populator 312 may be used during the processing of an add item request 310. For example, in some embodiments, a client application 110 may generate such a request, which may not specify a partition key value for the new item. Accordingly, the key value populator 312 may be called upon to assign a new partition key value to the new item. The new item is then submitted via an insertion request 314 to the database object 160, which places the item in the appropriate partition, for example sorted partition 170*n*. As discussed, the assigned partition key dictates the partition that the item will be stored in.

The key value populator 312 may employ a number of different algorithms to assign the partition key value to a data item. In some embodiments, the key value populator 312 may assign the partition key value in a pseudorandom fashion. For example, the partition key value may be assigned randomly, such that data items will be distributed among the partition key value approximately evenly. In some embodiments, the key value populator 312 may assign the partition key in a round robin fashion, cycling through each of the sorted partitions 170.

In some embodiments, the key value populator 312 may base the assignment as least in part on one or more attributes of the item. For example, a key value populator 312 may use a hash of one or more attributes in the items in the assignment process. Such use of an attribute may be used to ensure that items are even distributed across the partitions with respect to that attribute, so that certain expected queries will not generate a hotspot in the database object.

In some embodiments, the key value populator 312 may use collected metrics, which may be maintained by the partition key set manager 124, to assign partition key values. For example, the metrics may indicate that certain partition keys are experiencing large spikes in access rate, or even throttling exceptions. In response, the key value populator 312 may adapt to conditions by assigning less items to those partition key values, or not assigning any further items to those partition key values.

In some embodiments, the key value populator 312 may be capable of using all of the assignment algorithms described above, individually or in combination. In some embodiments, the behavior of the key value populator 312 may be configurable or be dictated based on the application 110. In addition to the item addition operation 310, the functionality of the key value populator 312 may be used in other operations. For example, in some embodiments the key value populator 312 may be invoked during a rebalancing operation by the partition key rebalancer 126, to move data items away from a particular partition key, and assign those data items to appropriate new partition keys according to the key assignor's algorithm.

In some embodiments, the new items may be stored at a location in the selected partition 170n based on their sort key values. In some embodiments, the database object may be created with a sort key, such that all items are stored in sort order according to each item's sort key value. By storing the items in sort order in the sorted partitions 170, the database object is optimized for queries that specify query conditions based on the sort key.

In some embodiments, the query manager 128 may implement a query generator 322 and/or a query result aggregator 328. The query generator 322 and query result aggregator 328 may be used in combination to process an item fetch request 320 that is directed to the APSI. For example, in some cases, the item fetch request 320 may not specify a partition key value of the database object. The item fetch request 320 may specify filter conditions for items, which may be based on a sort key of the database object, for example in a range filter. Fetch requests that filter on the sort key may be processed more quickly, as the items are stored in sorted order in the sorted partitions 170.

In some embodiments, in response to a fetch request, the query generator 322 may generate queries to the sorted partitions 170a-n. In some embodiments, the query generator may send the queries 324 to each of the sorted partitions 170. In some embodiments, each sorted partition 170 is managed independently by a replica group, which is able to handle the queries independently. The query generator 322 may send out 324 the queries in parallel or in staggered batches. Once the queries are issued, the query generator 322 may wait for the results from the sorted partitions 170, and provide the results to the query results aggregator 328 for aggregation work. In some embodiments, the query generator 322 may recognize that for some types of fetch requests, no additional aggregation work is required. In that case, the query generator 322 may simply return the results from each of the queries immediately as they are received.

In some embodiments, the query result aggregator 328 may perform functions to aggregate the query results received 326 from each sorted partition 170a-n before the results are returned to the client application 110. For example, in some embodiments, the fetch request may specify a sort order. Accordingly, the query result aggregator 328 may take the results from each of the sorted partitions 170, and place the results in a global sort order. In some embodiments, the database object may store items in its partitions 170 according to a sort order based on a specified sort key. This sorting may enable optimized results fetching for queries that specify a sort key condition. When this occurs, the query results from each partition may be returned to the query result aggregator 328 already in sorted order.

For example, returning to FIG. 2B, FIG. 2B illustrates three partitions of an index that maintains a sort key 280, which may be an order time attribute for a pizza order index. When a query specifying the sort key 280 is received, the query generator 322 may issue queries to each of the three sorted partitions 170a-c. For example, a query may include a condition that only items with order times between 2:00 and 3:00 be returned. Because the sorted partitions 170 store the items in order based on the sort key 280, the results may be returned very quickly, and in sorted order.

In some embodiments, the query result aggregator 328 may perform additional tasks, such as additional filtering of the results. For example, in the case that a query searches for the three latest pizza orders according to the order time attribute, the sorted partitions 170a-c may each return its top three orders. The query results aggregator 328 may take the three partitions' top three results, and obtain the top three results from those sub-results. In some embodiments, the query results aggregator 328 and the database 150 may support more complex aggregation functions, such as "sum" functions or "group by" functions. For example, to aggregate query results, the query result aggregator 328 may be programmed with logic to support these aggregation functions across all sorted partitions 170. For example, to implement a "sum" function, the query result aggregator 328 may perform a global sum of all sub-sums provided by the sorted partitions 170.

In some embodiments, the functionality of the query generator 322 and query result aggregator 328 may also be used in other operations, for example update or delete item operations from the client application 110. For example, in response to an update or delete operation, the query generator 322 may be configured to propagate the update or delete to each of the sorted partitions 170 in parallel, using the appropriate partition key values. The query result aggregator 328 may be configured to receive acknowledgements of the update or delete from the sorted partitions 170. When all partitions have appropriately acknowledged the operations, the query result aggregator 328 may return an aggregated acknowledgement back to the client, which may include for example an aggregated item count affected by the update or delete operation. By processing updates or deletes to all partitions in parallel, the requests may be performed much more quickly.

Figure 4A:
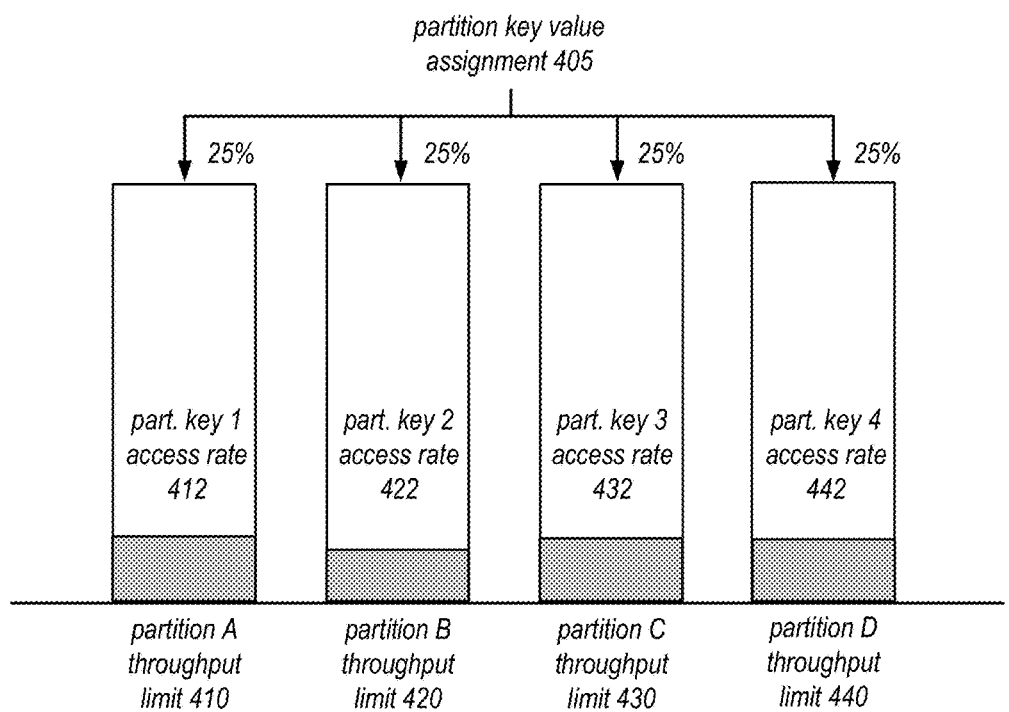
FIGS. 4A-4D illustrate example balancing operations that are performed by a client system that manages partition keys for a partitioned database object to improve throughput, according to some embodiments.

FIGS. 4A-4D illustrate example types of balancing operations that are performed by a client system that manages partition keys for a partitioned database object to improve throughput, according to some embodiments. FIG. 4A depicts the throughput limits of four physical partitions of a database object, limit 410 for partition A, limit 420 for partition B, limit 430 for partition C, and limit 440 for partition D. The figure also depicts four partition key values that are stored in each of the partitions, partition key values 1, 2, 3, and 4, respectively. As discussed, these partition key values may be generated by a client system module such as the partition key set manager 124 to take full advantage of the provisioned capacity or throughput of the database object. For example, the partition key set manager 124 may generate the set of partition key values based on the throughput criteria of the database object 160. In some embodiments, the partition key manager 120 may also be aware of other attributes of the partitions, such as the throughput limit of each partition of a database object 160. Based on this information, the partition key manager 120 may generate sufficient keys such that the storage capacity or throughput of all of partitions of the database object can be utilized. In some embodiments, to allow for more flexibility in adjusting how data items are stored in the partitions, the partition key set manager may generate more than four partition key values for the four partitions.

As shown, the four partitions keys values 1-4 are experiencing different levels of access rates 412, 422, 432, and 442, respectively, as indicated by the colored bars. The indicated levels may be an average rate of access seen over some past time period, for example past 24 hours, or the maximum or minimum level seen over the past time period. In some embodiments, different types of usage metrics may be tracked for different time windows, to allow the client to make better decisions to balance the partition keys. As shown, at current access rate levels, none of the partition keys values 1-4 are in danger of exceeding their respective partition limits 410, 420, 430, and 440. Accordingly, the client system or a key value populator 312 discussed in FIG. 3 may assign new data items to each partition key value in approximately even portions. For example, new data items may be assigned to the partition keys values 1-4 randomly at respective distributions of 25% each, or in a round robin fashion to the four partitions keys.

Figure 4B:
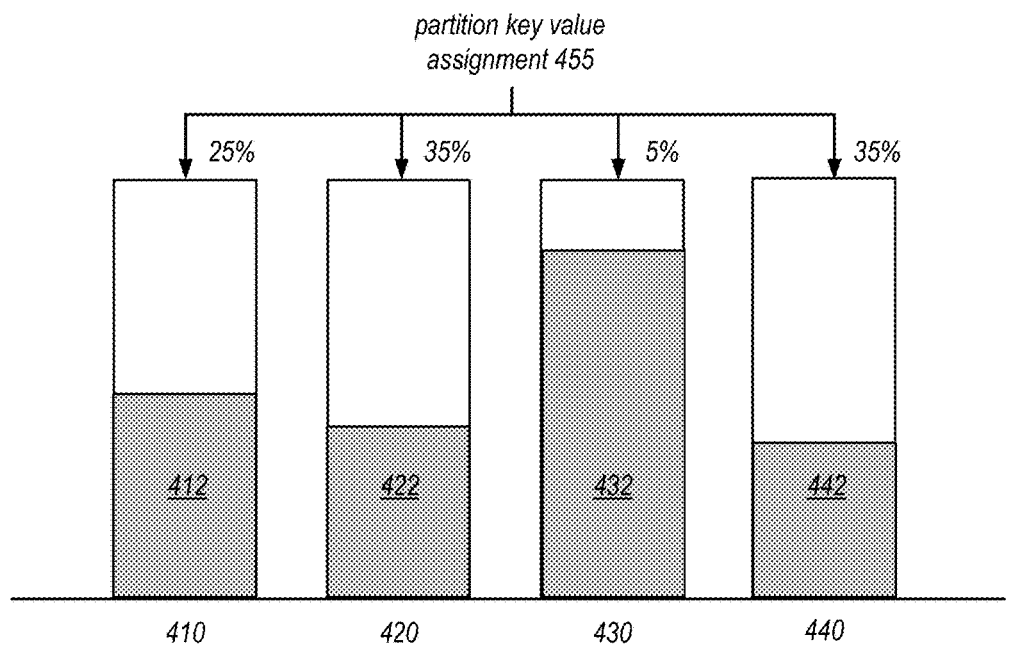

In FIG. 4B, the respective a different situation where access rate levels of the partition key values have changed. As discussed, usage metrics such as the access rate levels of the partition keys may be collected and tracked by the client system, for example by the partition key set manager 124. As shown, the access rate level 432 for partition key 3 has now reach a high level, which is close to the throughput limit 430 of partition C. In this situation, the client system may adjust the assignment function to adaptively assign less data items to partition key value 3, and more to other partition key values that are experiencing relatively low rates of access. For example, the client system may adjust its assignment function 455 to only assign 5% of the new data items to partition key value 3, and 35% to partition key values 2 and 4. In some embodiments, such adaptations may be implemented as weights used in the assignment function. For example, the assignment function may assign data items to one of the four partition key values based on a probabilistic function, which favors those partition key values that are relatively underutilized. Such adaptive adjustments to the assignment function thus represents one way of keeping the partition keys relatively balanced in terms of their usage.

Figure 4C:
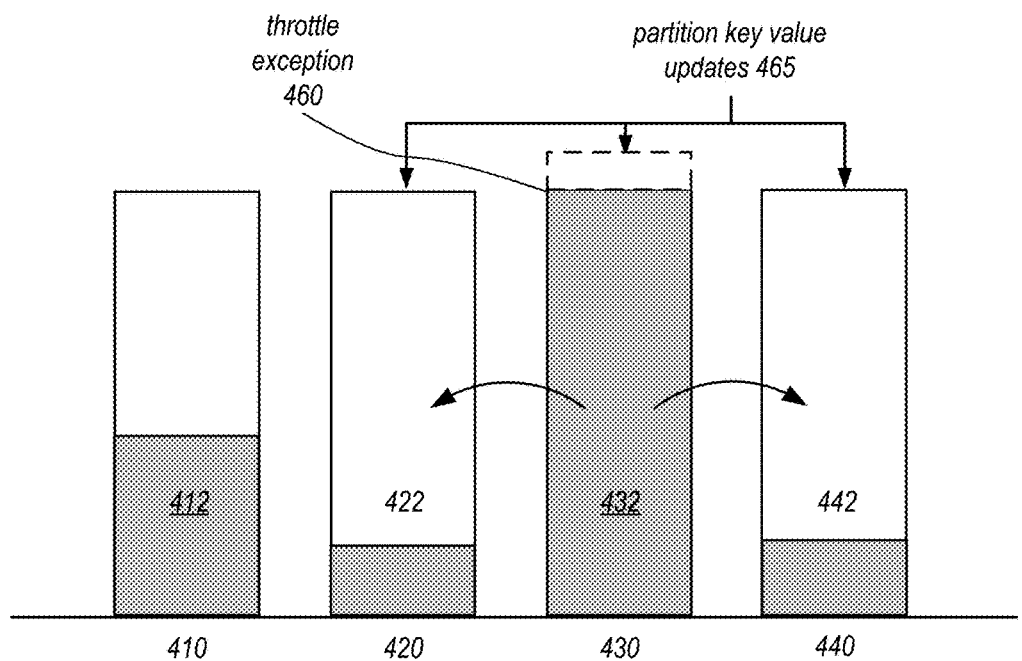

In FIG. 4C, the respective access rate levels of the partition key values are different again. In the figure, the access rate level of partition key 3 now exceeds the throughput limit of the resident partition (partition C) of the partition key. In such situations, some embodiments of the database may generate throttle exceptions 460, which means that access requests such as inserts and queries that exceed the access throughput limit of the partition are not serviced by the database. In some embodiments, these throttle exceptions indicate conditions in which the database will repartition the database object to add new partitions to the database object. As discussed, the client system may monitor these throttle exceptions for each partition key value, and may attempt to relieve the problem by performing rebalancing operations. For example, if some partition key values are experiencing throttling exceptions while some other partition key values are not, this may indicate an out-of-balance condition among the key values, and cause a reassignment of partition key values to occur.

For example, as shown, the client may perform a partition key value update operation 465 to distribute data items currently assigned to partition key to other less utilized partition keys, such as partition keys 2 and 4. This represents a faster way of rebalancing as compared to the adjusting the assignment function for inserting new data items. It achieves balance among the keys more quickly, but requires the generation of extra requests to the database object, which may aggravate the congestion problem in the short term. Thus, in some embodiments, the partition key update operation, which may be carried out by the partition key rebalancer 126 of FIG. 1B, may only be performed in emergency situations, when the partition keys severely out of balance, or when the database object is throttling or close to throttling requests.

In some embodiments, the partition key update 465 may be an update request sent to the database object to change the partition key attribute of a subset of data items (e.g., those having partition key 3), which causes the database object to move those data items to the appropriate partition based on the data items' new partition key value. In some embodiments, the partition key update 465 may involve the client system to separately remove the data items from the old partition key value, and re-insert the data items under the new partition key values. In some embodiments, the partition key value update operation 465 may not specify a destination partition key for the subset of data items, and the destination partition key values may be chosen by a module such as key value populator 312, which may reassign the data items to new partition key values on an item-by-item basis.

In some embodiments, to avoid aggravating the throttling or overload problems that are being experienced by a partition key value, the client may wait to move the data items at a time in the future. For example, in some embodiments, the client may wait until a time when partition key value 3 or partition C is relatively idle, before proceeding to move the data items from partition key value 3. In some embodiments, the client system may wait until the partition key value ceases to generate throttling exceptions for a period of time, for example 10 minutes. In some embodiments, the client system may track the number of recent accesses or a recent access rate to each partition key value, for example in the last 5 minutes. The client may determine that given the recent access rate to a partition key value that the partition key value is not in danger of generating throttling exceptions. Thus, the client system can move data items between partition key values during periods when the affected partition key values are relatively quiet.

In some embodiments, the client system may not generate extra access request to the database to move the data items between partition key values. Rather, the client system may wait for other write requests to the database object, and piggyback the partition key update operation on these write requests. Thus, for example, the partition key rebalancer 126 may not immediately send update requests to the database object to move data items from partition key value 3, but wait for other write requests to data items having partition key value 3. When these write requests are sent to the database object, the partition key value update is included with the write requests. In this way, the partition key update process can opportunistically take advantage of other requests directed to the database object, without adding any additional access requests. In some embodiments, the rebalancing of the partition key values may be performed in this manner on a continuous basis, without adding to the access load of the database object.

Figure 4D:
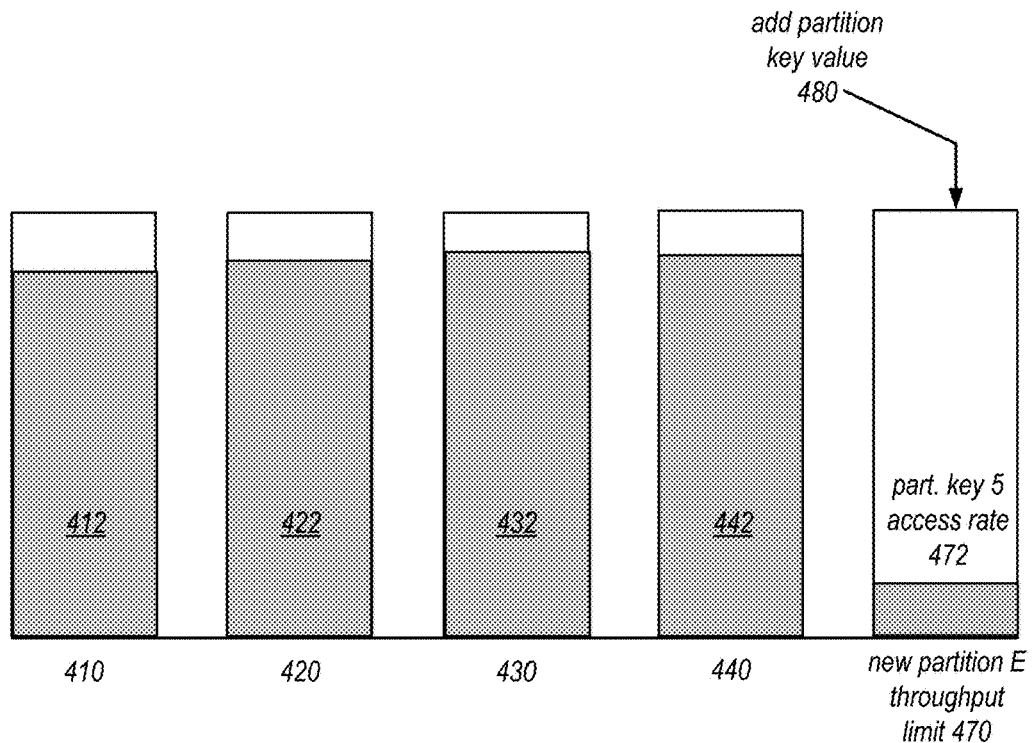

In FIG. 4D, a new partition E has been added by the database to the database object. The new partition E may have an access throughput limit 470. Depending on the implementation of the database, new partitions may be added to database objects in various circumstances. For example, in some embodiments, when overall capacity or throughput for a table or index reaches a critical level, new partitions may be provisioned for the table or index. In some cases, a single partition may be split to divide the data into two new partitions. In some cases, all of the partitions for a database object may be split. In some cases, the splitting of partitions may increase the computing capacity and parallelization of the database object, but leave the overall throughput of the database object unchanged, such that each partition will have a throughput limit of only half of what it was before the split. In some cases, new partitions may be introduced as a result of a modification of the table or index to provision for a higher throughput criteria. As discussed, modules in the client, for example the partition key set manager 124, may predict or detect such conditions or events indicating a repartitioning of the database object, and add or reduce partition key values accordingly, to take full advantage of the current partitioning state of the database object.

As shown, when such a new partition E is predicted or detected, the client system may add a new partition key value 480, to generate a new partition key value 5 to take advantage of the throughput of the new partition. The new partition key value 5 may initially begin with only few data items, resulting in a relatively low rate of access. However, after the creation of the new partition key value, the client system may use other rebalancing methods, for example adaptive key assignments and partition key value updates, to gradually bring the partition key values into balance.

In some embodiments, the database may reduce the number of partitions of a database object. This may occur for example in response to a reduction of provisioned throughput by the client, or when the database determines that the amount of data or level of access to a partition in the database object no longer justifies a separate partition. When an elimination of a partition is predicted or detected by the client, the client may remove one or more partition key values in response. In some embodiments, having an excessive number of partition key values is counterproductive, as it adds to the number of parallel requests that must be sent to the database object for reads and writes, and requires additional computation on the client merge all of the read results from the different partition key values. In some embodiments, before a particular partition key value is removed by the partition key set manager, all data items associated with that particular partition key value are moved to other partition key value.

FIG. 5 illustrates a number of attributes and metrics that may be collected by a client system to manage partition keys for a partitioned database object to improve throughput, according to some embodiments. As shown, a number of metrics data may be collected for each partition key value, and kept up-to-date in a table such as table 500. In some embodiments, the table 500 may be maintained by the partition key set manager 124, as discussed in connection with FIG. 1. The data may be gathered from different sources, such as other modules on the client that interfaces with the database. In some embodiments, the table 500 may be made available to other modules on the client to make rebalancing decisions. For example, the metrics may be made available to the insertion manager 122, which uses the metrics to determine how to assign partition key values to new data items. As another example, the metrics data may be made available to the partition key rebalancer 126, which uses the information to determine when and how to move data items among the partition key values.

As shown, table 500 includes one row for each partition key 510, each row having a number of fields. Field 512 indicates the total number accesses that are seen for each partition key value in the last 24 hours. This information may be collected from one or more modules of the client that are responsible for accessing the database object. For example, in some embodiments, the client system may be the only system that can insert items into the database object, and thus the number of accesses to the database object may simply be tracked with a counter at the client system. The number of accesses 512 may be used as one factor to determine how to balance the partition key values. In addition, the number of accesses may also be used to predict if the database will repartition the database object. Accordingly, the client may move some items away from a partition key value when the number of total access for that partition key value approaches a known limit, so as to proactively generate new partition key values before a repartitioning by the database.

As shown, field 514 indicates the maximum access rate that each partition key has experienced in the last 24 hours. The peak access rate of the partition key may be a good indication of its usage, and may be a factor considered during the client's rebalancing operations. In some embodiments, the clients may also determine and track the average and minimum access rate levels of each key, to obtain a more accurate picture of the usage of each key. In some embodiments, the client may gather other usage metrics that indicate the access rates at different periods of the day, for example, on an hourly basis. This data may allow the rebalancing operations to rebalance the keys more intelligently, for example by move certain data items that are often access during a peak period to reduce the peak. As shown, field 514 indicates that partition key values 522, 524, and 536 are experiencing dangerously high rates of access. For key values 522 and 524, the maximum access rates are already over the throughput limits of the respective partitions (as indicated by the throttles), and so more drastic rebalancing operations, such as an update of the data items having those partition key values, may be warranted. In some embodiments, the client system may monitor the received throttle exceptions for each partition key value to determine out-of-balance conditions. If some partition key values are experiencing throttling but other partition key values are not, this may indicate to the client system that there is an out-of-balance condition, and that a rebalancing is necessary. As illustrated, for key value 536, no throttling has been received, but the max access rate is still dangerously high. Thus, the client system may employ a less drastic rebalancing technique, such as slowing down or stopping the insertion manager from assigning more data items to this key value, or gradually moving a small subset of data items away from this key.

As shown, field 516 indicates the number of throttle exceptions that are experienced by each partition key value during the last 24-hour period. This is another, even more severe indicator of the usage level of partition keys. In some embodiments, the receipt of a throttle may also signal a repartition. Thus, this data may be used for not just rebalancing operations, but also used by the partition key set manager to possibly generate new partition key values. As shown, the partition key values 2 and 3 have recently experienced throttles from their respective partitions.

As shown, field 518 indicates the access rate of each partition key value in the last 5 minutes. This type of data may indicate the current activity load of each partition key value, and may be used to determine whether a rebalancing operation may be performed on the key value in the near term. For example, a key value that is recently receiving a large number of access requests may not be able to handle the added request traffic for a partition key value update. Thus, the balancer modules of the client system may monitor this field to determine whether a rebalancing operation should proceed immediately, or be postponed until a later time. In some embodiments, the client system may use this data to stagger its own generation of access requests to the database. For example, if the client receives 1000 access request from a client application to insert data items into a database object, and the client sees from the metrics that a large number of inserts will impact a partition key value that is currently experiencing a high traffic load, the client may determine to spread out the inserts to that partition key value over a longer period of time, so as to not generate throttling exceptions or trigger a repartitioning of that partition.

In some embodiments, once a rebalancing operation is indicated (e.g., either a change of the key assignment function for new data items or a reassignment of the key values of existing data items), table 500 may be updated to show that a rebalancing was performed or is scheduled to be performed. For example, the update may indicate in a field that key values 522 and 524 are currently being rebalanced, and thus the client may not take any further measures to rebalance these key values. In some embodiments, the usage metrics 540 for key values that have been recently rebalanced or is being rebalanced may be reset, so that the metrics no longer trigger any corrective action. In some embodiments, the metrics may be accrued again after the rebalancing operation is finished.

Figure 6:
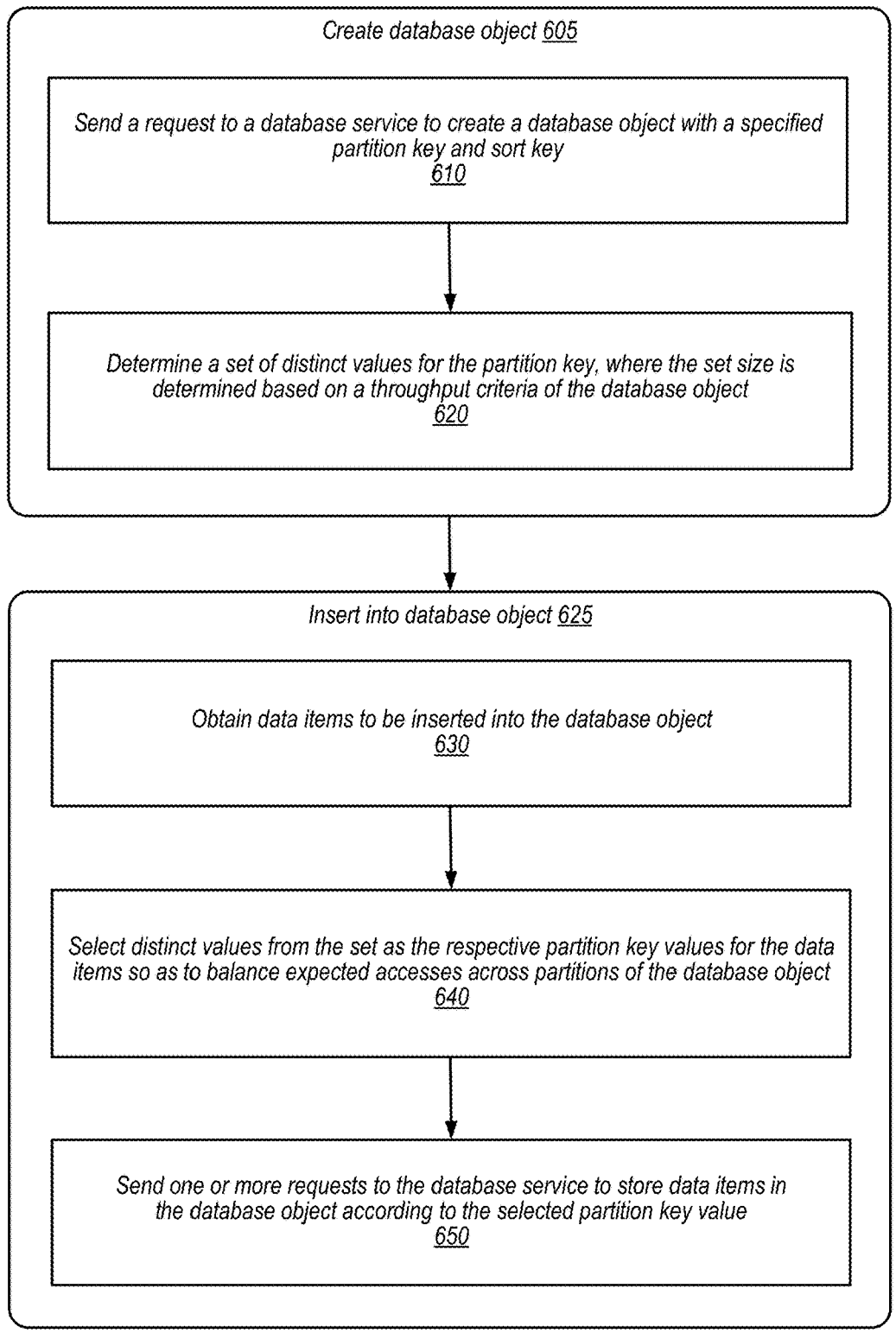
FIG. 6 is a flowchart illustrating a process of determining a set of partition key values and inserting data items into a partitioned database object using the set of partition key values, according to some embodiments.

FIG. 6 is a flowchart illustrating a process of determining a set of partition key values and inserting data items into a partitioned database object using the set of partition key values, according to some embodiments. The process may be performed divided into two sub-processes. Sub-process 605 comprise the creation of the database object by the client. This sub-process may be performed by for example the partition key set manager 124 discussed in connection with FIG. 1B. Sub-process 625 comprises an insertion of data items into the database object by the client. Sub-process 625 may be performed by for example the insertion manager 122, as discussed in connection with FIG. 1B.

At operation 610, a request is sent to a database service to create a database object. The request may specify a partition key and a sort key for the database object. The partition key may be used by the database to determine which partition a data item in the database object is stored in. The sort key may be used to determine where a data item is stored in a partition, because data items are stored in sort order according to the sort key.

At operation 620, a set of distinction partition key values is determined, wherein the number of partition key values in the set or set size is determined based at least in part on the throughput criteria of the database object. The throughput criteria for the database object may specify the amount of access requests that the database object will be configured to handle, for example, 1000 read or write requests per second. In some embodiments, the client system may be billed for use of the database object based on the throughput criteria. In some embodiments, when access requests to the database object exceed the access throughput criteria, the database may throttle the excess requests. In some embodiments, the number of values in the set may be determined based on a quotient of the access throughput criteria of the database object and a per-partition access throughput limit of the database service. For example, to meet a throughput criteria of 1000 IOPS, where each partition has a throughput limit of 100 IOPS, the client may determine that the database object should optimally have at least 10 partitions. Accordingly, the client may generate 10 partition key values to take advantage of the 10 partitions. In some embodiments, operations 610 and 620 are performed at the time of the creation of the database object. After the database object is created, the process may proceed to insert items into the object, as represented by sub-process 625.

At operation 630, data items to be inserted into the database object are obtained. For example, in some embodiments, the data items may be obtained from a client application (e.g. client application 110) to a data access layer of the client system. In some embodiments, the client application may not interact directly with the database, and may not be aware of the access interface of the database. In such embodiments, the insert request may be generated by the data access layer.

At operation 640, individual partition key values are selected from the set of partition key values as respective partition key values for the data items. The selection may be performed in a manner so as to balance expected accesses to the database object across the partitions of the database object. In some embodiments, the selections may be based on an assignment function that strives to assign balance the access throughput of each partition. In some embodiments, the assignment may be performed randomly, based on a pseudorandom value that is approximately evenly distributed across the partition key values. In some embodiments, the assignment may be performed in a round robin fashion over the partition keys. In some embodiments, the assignment may be performed based on a hash of one or more attributes of the data item. In some embodiments, the assignment may be based on usage metrics collected for each partition key, for example, a measured access rate of the partition key values or the number of throttle exceptions received for the partition key values.

At operation 650, the data item is sent to the database service to be stored in the database object, in the appropriate partition according to the selected partition key. The data item may be provided in an insert request that conforms to the database's access interface. The data item may include the partition key value and a sort key value, so that the database will store the data item in the appropriate partition and in appropriate sort position within the partition. The assignment function may cause the of data items in the database object to be distributed substantially evenly across the database object's partitions. This way, the client can take full advantage of the provisioned throughput of the database object.

Figure 7:
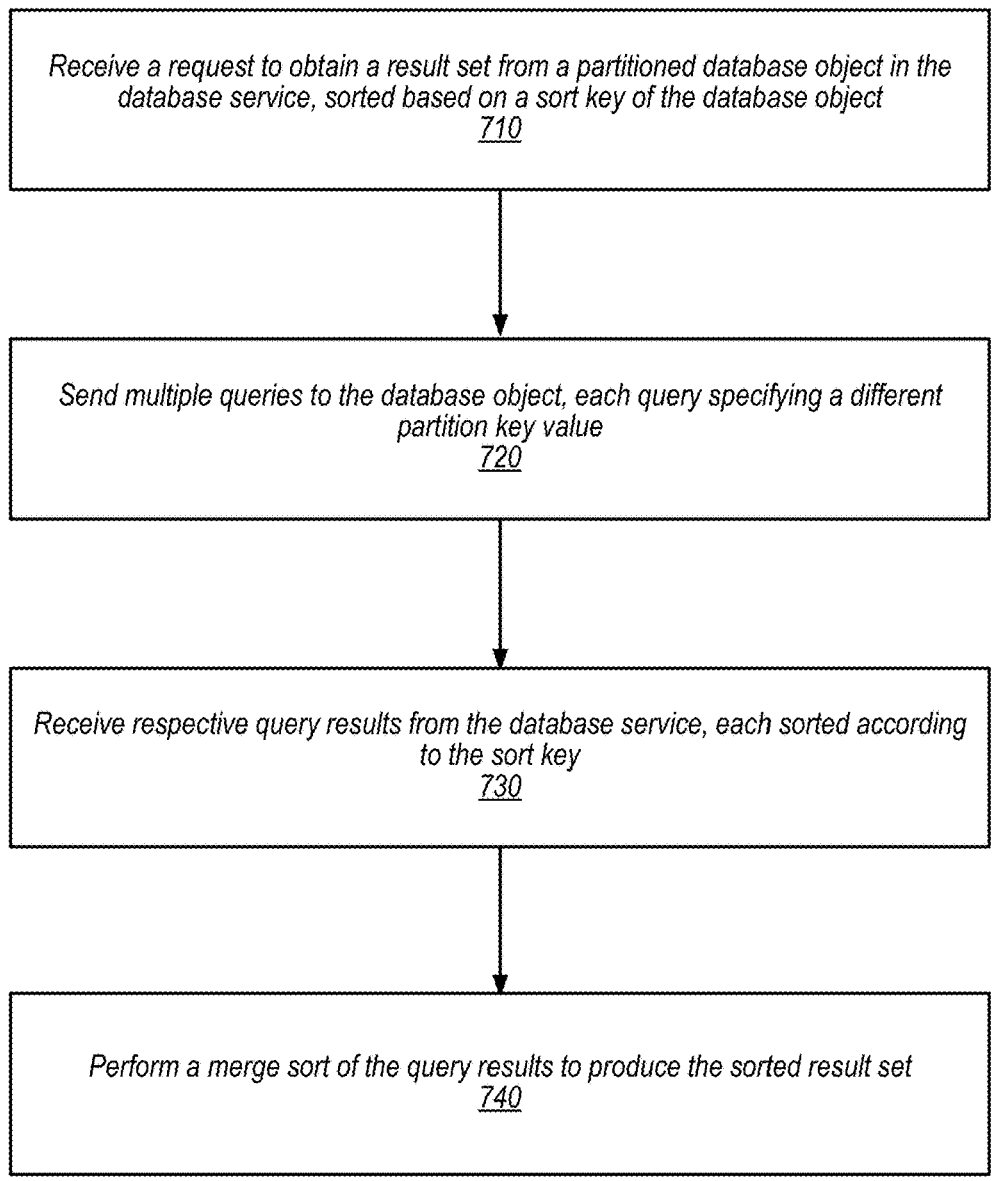
FIG. 7 is a flowchart illustrating a process of querying data items from a partitioned database object using a set of partition key values, according to some embodiments.

FIG. 7 is a flowchart illustrating a process of querying data items from a partitioned database object using a set of partition key values, according to some embodiments. The process may be performed by one or more modules of a client system that accesses data from a database system, for example, query manager 128 as discussed in connection with FIG. 1.

At operation 710, a request to obtain a sorted result set from a database object is received. The database object is a partitioned database object having a number of partitions, and data items are stored in different partitions based on their partition key values. In some embodiments, the database object may also have a sort key, and the data items are stored in sorted order according to the sort key in each of the partitions. The request to obtain the sorted result set may specify that the result set should be sorted according to the sort key.

At operation 720, multiple queries are sent to the database service based on the request. Each query may specify a different partition key value. In some embodiments, this operation is performed by a data access layer of the client system, which is configured to generate database queries based on the requests of a client application (e.g. client application 110). The generated queries may convert one or more filtering criteria in the request to query conditions. Moreover, the queries may each specify a different partition key, so that one query will be performed for each partition key value. In some embodiments, the queries may be sent to the database in parallel. In some embodiments, the database may perform the servicing of the queries in parallel.

At operation 730, respective query results are received in response to the queries. In some embodiments, the database may provide these query results in parallel to the client. In some embodiments, the provided query results may each be locally sorted. In other words, the database may perform some initial work to sort the result sets within each partition key, before they are provided back to the client.

At operation 740, a merge sort is performed on the query results to produce the sorted results set that was requested. In some embodiments, because the query results from the multiple partition keys are already sorted, only a merge sort is needed to aggregate the query results into a fully sorted result set. In some embodiments, the merge sort may be performed in one pass of the query results, selecting the top result from the top results of each partition key to produce the fully sorted result set. In some embodiments, the query results sets for the different partition keys may be provided in pages, which may be successively fetched by the client system to build the fully sorted result set.

Figure 8:
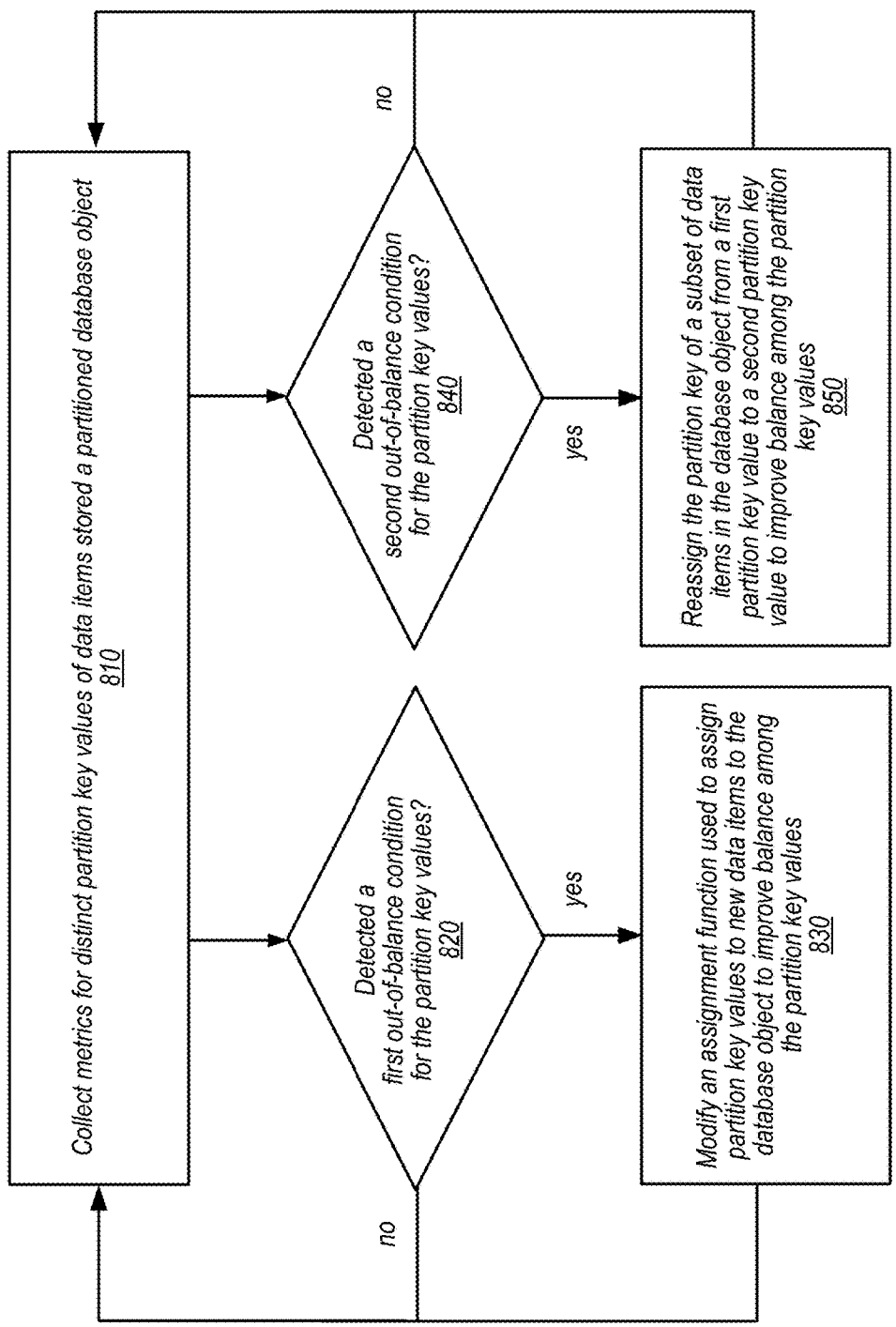
FIG. 8 is a flowchart illustrating a process of rebalancing the throughput levels of different partition key values used for a partitioned database object, according to some embodiments.

FIG. 8 is a flowchart illustrating a process of rebalancing the accesses of different partition key values used for a partitioned database object, according to some embodiments. The process may be performed by one or more modules of a client system that accesses data from a database system, for example, one or more of the partition key set manager 124, insertion manager 122, and partition key rebalancer 126 of FIG. 1.

At operation 810, metrics are collected for partition key values used by data items stored in a partitioned database object. The data items may be stored in different partitions of the database object based on their respective partition key values. The metrics data may include for example some of the usage metrics data discussed in connection with FIG. 5, including for example access rate data for each of the partition key values. As discussed, the partition key values may be generated by a client to the database system hosting the database object allow the client to control how data items are distributed across the partitions of the database object. The metrics data may be collected by one or more modules in the client system that interfaces with the database, and gathered into a database object that is maintained by the client system.

At operation 820, a determination is made whether a first out-of-balance condition in the partition key values is detected. In some embodiments, an out-of-balance condition may be determined from the collected metrics of the previous operation. In some embodiments, the out-of-balance condition may be based on the maximum level of access rate that each partition key value has experienced, in a time period. In some embodiments, the access throughput level may be normalized against the access throughput limit of each partition that stores the partition key values. For example, it may be determined that out of four partitions keys values used for data items in a database object, the third key value is experiencing twice the rate of access as the other three partition key values. Depending on the policy or configuration of the client, such a situation may constitute an out-of-balance condition.

At operation 830, a modification is made to an assignment function that is used to assign partition key values to new data items to be inserted into the database object, to improve balance among the partition key values. For example, in some embodiments, an insertion manager (e.g., insertion manager 122) may implement an assignment function that assigns partition key values to new data items to the database object. The assignment function may adjust, adaptively, based on the current state of the partition key values, to assign more data items to partition key values that are underutilized, and less data items (or no data items) to partition key values that are overutilized. In some embodiments, the assignment function is adapts to the metrics by using weights applied to some of the metrics data. The modification in the assignment of new data items is one way of improving the balance among the partition key values.

At operation 840, a determination is made whether a second out-of-balance condition in the partition key values is detected. In some embodiments, the second out-of-balance condition may be determined in similar fashion as the first out-of-balance condition. In some embodiments, the second out-of-balance condition may be more severe than the first out-of-balanced condition. For example, in some cases, the client may have received one or more throttling exceptions from the database in connection with access requests directed to data items having particular partition key values. These throttling exceptions may represent a severe out-of-balance condition, and cause the client to employ faster techniques to rebalance the partition key values.

At operation 850, the partition key value of a subset of data items in the database object is reassigned from a first partition key value to a second partition key value to improve balance among the partition key values. This operation thus represents a faster technique to rebalance the partition key values. In some embodiments, this reassignment may be performed by a partition key rebalancer module (e.g., partition key rebalancer 126) of the client system. The reassignment may involve an update request to the database to change the partition key values of the subset of data items, or in some embodiments, entail a deletion of the subset of data items and re-insertion of the data items with the new partition key value. In some embodiments, the subset of data items may be reassigned to more than one new partition key values, based on the same assignment function that is used to insert new data items.

In some embodiments, because the reassignment operation itself involves sending access requests to the database, the client may delay the reassignment operations until a time when the affected partition key values are not busy (e.g., actively servicing requests or generating throttling exceptions). In some embodiments, the client may track the number of accesses that have recently been sent to each partition key value or a recent access rate, so that reassignment operations are only sent to the partition key values when they have been recently inactive. In some embodiments, the reassignment operations may be piggybacked on other write requests directed to the database object, so that these write operations may perform the double duty of carrying out its intended update and also updating the partition key value to the data item. Using this piggybacking technique, the rebalancing process may be performed opportunistically as other write requests are transmitted, so that no additional access requests to the database are generated.

Figure 9:
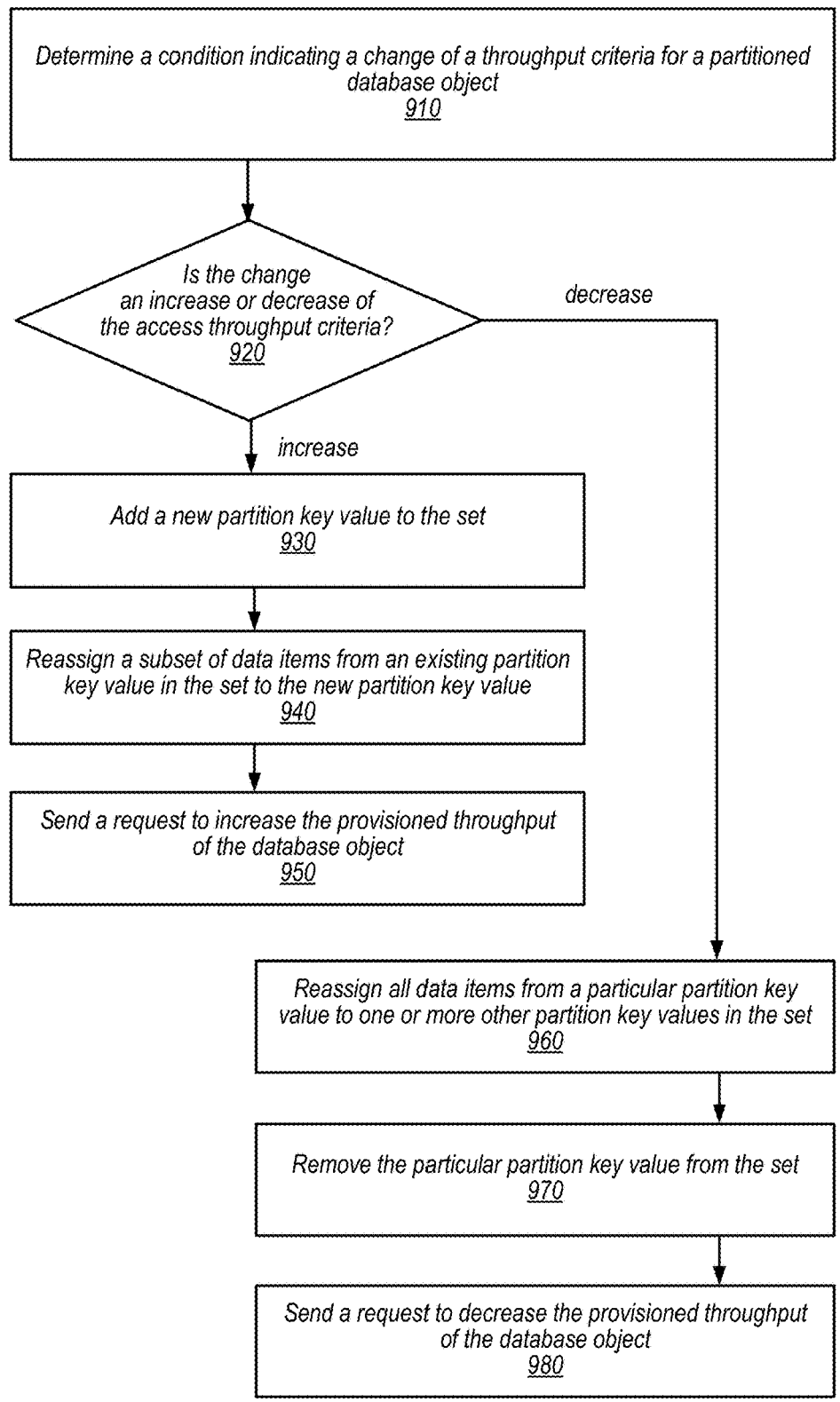
FIG. 9 is a flowchart illustrating a process of adding or removing partition key values that are used to improve throughput to a partitioned database object, according to some embodiments.

FIG. 9 is a flowchart illustrating a process of adding or removing partition key values that are used to improve throughput to a partitioned database object, according to some embodiments. The process may be performed by one or more modules of a client system that accesses data from a database system, for example, the partition key set manager 124 as discussed in connection with FIG. 1.

At operation 910, a determination is made of a condition indicating a change in a throughput criteria for a partitioned database object. The partitioned database object may store data items in different partitions based on their partition key values. As discussed, these partition key values may belong to a partition key set maintained by the client system, and assigned by the client system to data items to balance access throughput among the different partitions of the database object. In some embodiments, the condition may be determined based on a request from a client application that is reconfiguring the database object. In some embodiments, the change of throughput criteria may be initiated by components within a data access layer of the client, for example, to increase the access throughput limits of the database object based on observed request traffic load. In some embodiments, the condition may be detected from the database or predicted based on documented behavior of the database. Such conditions may be used as triggers to the client to adjust its partition key set accordingly.

At operation 920, a determination is made whether the change in the throughput criteria represents an increase or decrease of the criteria. In some cases, the change may comprise a requested increase in one or more access throughput limits. In some cases, a change may comprise an increase in the number of partitions automatically performed by the database. Such changes may be determined to be increases by the client system. Conversely, changes may involve a decrease in the access throughput limit of the database object or a database object partition, or a decrease in the number of partitions for a database object, which may be determined to be a decrease of the throughput criteria for the database object.

At operation 930, if the change is an increase of the criteria, a new partition key value is added to the set of partition key values for the database object. The set of partition key value may be maintained by the client, for example by partition key set manager 124, and these partition key values are used in the client's insertion, querying, and rebalancing operations. In some embodiments, partition key set manager 124 may recompute the number of partition key values that are warranted in light of the new throughput criteria, and generate additional key values as needed.

At operation 940, a subset of data items from an existing partition key value in the set is reassigned to the new partition key value. This operation may be performed by the partition key rebalancer 126 of FIG. 1. In this way, the set of partition key values for the database object are quickly brought back into balance. Operation 940 is optional. In some embodiments, the rebalancing may be performed by slower means, for example, by adjusting the assignment function used to insert new data items to assign more data items to the new partition key value. In some embodiments, more than one existing partition key values may be chosen to contribute data items to the new partitions. These contributing partition key values may be chosen based on their access rates or utilization levels. In some embodiments, the reassignment may be performed lazily or on an as needed basis. In some embodiments, the reassignments may be piggybacked on other write operations to the database, so as to not generate addition access requests to the database.

At operation 950, a request is sent to increase the provisioned throughput of the database object. The request may be sent by the client system to the database service. In some embodiments, operation 950 is optional. For example, in some cases the database service itself may detect a condition that requires a change in the throughput criteria, and adjust the provisioned throughput or partitioning of the database object without any request from the client. In some embodiments, operation 950 may be performed after the new partition key value is created and assigned to data items. Thus, if the request to increase the provisioned throughput results in a new partition being created by the database, the data items may be evenly distributed according to the repartitioning protocol of the database.

At operation 960, if the change is a decrease in the criteria, all data items with a particular partition key value may be reassigned to one or more other partition key values in the set. Thus, a determination is made to eliminate the particular partition key in light of the decreased access throughput criteria. However, before the particular partition key may be removed, all of the data items having the particular partition key value are moved to other partition key values via this operation. In some embodiments, the data items may be reassigned one by one, according to the assignment function that is used by the insertion manager 122. In some embodiments, the reassignment, may be performed lazily or on an as needed basis, or piggybacked on other write requests to the database so as to not generate addition access requests to the database.

At operation 970, after all data items of the particular partition key value have been reassigned, the particular partition key value is removed from the set of partition key values. After this operation, any insertion and rebalancing operations will no longer be able to use the removed partition key value.

At operation 980, a request is sent to the decrease the provisioned throughput of the database object. The request may be sent by the client system to the database service. In some embodiments, operation 980 is optional. For example, in some cases the database service itself may detect a condition that requires a change in the throughput criteria, and adjust the provisioned throughput or partitioning of the database object without any request from the client. In some embodiments, operation 980 may be performed after the particular partition key value is eliminated. Thus, if the request to decrease the provisioned throughput results in reduction in the number of partitions by the database, the data items may be evenly redistributed according to the repartitioning protocol of the database.

Figure 10:
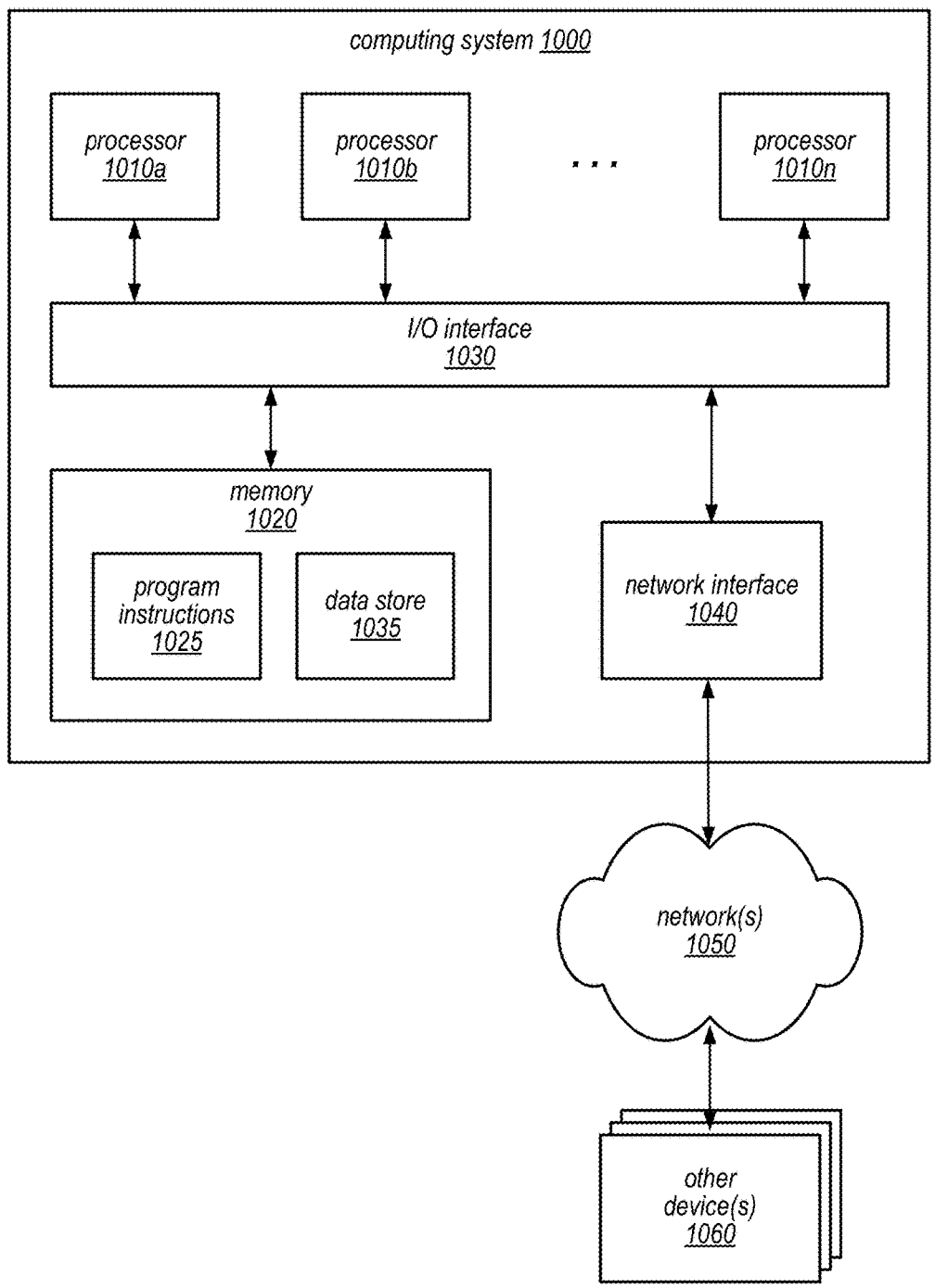
FIG. 10 is a block diagram illustrating an example computer system that can be used to implement one or more portions of a client system that manages partition keys for a partitioned database object to improve throughput, according to some embodiments.

FIG. 10 is a block diagram illustrating an example computer system that can be used to implement one or more portions of a storage system that employs an auto-partitioning secondary index, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 920, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
  a client system implemented comprising one or more processors and memory and configured to:
    send a request to a database service to designate a first attribute of a database object as a partition key and a second attribute of the database object as a sort key, wherein the database service partitions data items in the database object across a plurality of partitions based on the partition key and sorts the data items in each partition based on the sort key;
    determine a set of distinct partition key values for the partition key, wherein a number of partition key values in the set is determined based at least in part on a throughput criteria for the database object and a per-partition throughput limit of the database service;
    select individual partition key values from the set to populate the first attribute of respective data items to be stored in the database object, wherein the individual partition key values are selected to balance expected accesses across the plurality of partitions of the database object partitioned according to the partition key; and send one or more requests to the database service to store the data items including the selected individual partition key values in the database object.

2. The system of claim 1, wherein the client system is further configured to:
obtain sorted results of the database object, wherein to obtain the sorted results the client system is configured to:
send a plurality of queries to the database object, each query specifying a different partition key value from the set,
receive results from the database service for each query separately sorted on the sort key, and
perform a merge sort of the query results sorted on the second attribute.

3. The system of claim 1, wherein to select individual partition key values to populate the first attribute of respective data items, the client system is configured to apply an assignment function that assigns less data items to a first partition key value with higher usage metrics and more data items to a second partition key value with lower usage metrics.

4. The system of claim 1, wherein the client system is configured to:
determine an out-of-balance condition in usage metrics associated with the partition key values; and
modify a subset of data items in the database object to change their partition key values from a first partition key value with a higher usage metrics to a second partition key value with a lower usage metrics.

5. The system of claim 1, wherein the client system is configured to:
determine to increase the throughput criteria for the database object;
add one or more new partition key values to the set of distinct partition key values; and
request an increased provisioned throughput for the database object from the database service.

6. The system of claim 1, wherein to select individual partition key values to populate the first attribute of respective data items, the client system is configured select the partition key values in a pseudorandom fashion that evenly distributes the data items across the set of partition key values.

7. A method, comprising:
designating a first attribute of a database object as a partition key and a second attribute of the database object as a sort key, wherein a database service is to partition data items in the database object based on the partition key and is to sort the data items in each partition based on the sort key;
determining a first number of values for the partition key based at least in part on a throughput criteria for the database object and a per-partition throughput limit of the database service; and
selecting values from the first number of values to be assigned to the first attribute of the database object, wherein the values are selected to balance accesses to partitions of the database object.

8. The method of claim 7, further comprising:
receiving a request to obtain a result set from the database object sorted by the sort key;
sending a plurality of queries to the database object based on the request, each query specifying a different one of the first number of values; and
performing a merge sort of a plurality of query results for the plurality of queries to produce the result set sorted by the sort key.

9. The method of claim 7, wherein:
the database object is a secondary index for a table,
the designating is performed as part of a creation request for the secondary index, and
the first attribute designated as the partition key is different from the table's partition key.

10. The method of claim 7, wherein determining the first number of values for the partition key is based at least in part on a quotient of the throughput criteria for the database object and the per-partition throughput limit of the database service.

11. The method of claim 7, wherein selecting values to be assigned to the first attribute of the database object comprises selecting the values in a pseudorandom fashion that evenly distributes the data items across the first number of values.

12. The method of claim 7, further comprising collecting usage metrics for each of the first number of values; and wherein the selecting of the values is based at least in part on the usage metrics for the distinct values.

13. The method of claim 7, further comprising:
determining an out-of-balance condition in usage metrics associated with the first number of values for the first attribute; and
based at least in part on the out-of-balance condition, reassigning the first attribute of a subset of the data items in the database object from a first distinct value to a second distinct value in the first number of values.

14. The method of claim 13, reassigning the first attribute of the subset of data items in the database object from a first distinct value to a second distinct value comprises:
monitoring recent access rates for the first distinct value and the second distinct value; and
performing the reassigning at a time when the recent access rates for the first distinct value and the second distinct value are below a threshold.

15. The method of claim 13, wherein the reassigning of the subset of data items comprises piggybacking partition key value updates on other write requests to the database service directed to one or more of the subset of data items, so that the other write requests change the first attribute of the subset of data items from the first distinct value to the second distinct value.

16. The method of claim 13, wherein determining the out-of-balance condition comprises monitoring usage metrics for each value in the first number of values indicating a number of throttle exceptions that are received for accesses directed to data items in the database object having the value as the first attribute.

17. A non-transitory computer-accessible storage medium storing program instructions that when executed on one or more processors of a client system cause the client system to:
designate a first attribute of a database object as a partition key and a second attribute of the database object as a sort key, wherein a database service is to partition data items in the database object based on the partition key and is to sort the data items in each partition based on the sort key;
determine a first number of values for the partition key based at least in part on a throughput criteria for the database object and a per-partition throughput limit of the database service; and select values from the first number of values to be assigned to the first attribute of the database object, wherein the values are selected to balance accesses to partitions of the database object.

18. The non-transitory computer-accessible storage medium of claim 17, wherein the program instructions when executed cause the client system to:

determine a condition indicating a change of the throughput criteria of the database object; and add or remove one or more partition key values to or from the first number of values based at least in part on the condition indicating the change of the throughput criteria.

19. The non-transitory computer-accessible storage medium of claim 18, wherein the program instructions when executed cause the client system to:

subsequent to an addition of a new partition key value to the first number of values, reassign the first attribute of a subset of data items from an existing partition key value in the first number of values to the new partition key value.

20. The non-transitory computer-accessible storage medium of claim 18, wherein the program instructions when executed cause the client system to:

prior to a removal of a particular partition key value from the first number of values, reassign the first attribute of all data items assigned to the particular partition key value to one or more other partition values in the first number of values.

* * * * *